US012335904B2

(12) United States Patent
Edge

(10) Patent No.: US 12,335,904 B2
(45) Date of Patent: *Jun. 17, 2025

(54) METHODS AND SYSTEMS FOR SUPPORT OF LOCATION FOR THE INTERNET OF THINGS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,647

(22) Filed: Apr. 23, 2020

(65) Prior Publication Data

US 2020/0252902 A1 Aug. 6, 2020

Related U.S. Application Data

(63) Continuation of application No. 15/409,454, filed on Jan. 18, 2017.

(Continued)

(51) Int. Cl.
H04W 64/00 (2009.01)
H04W 4/02 (2018.01)
(Continued)

(52) U.S. Cl.
CPC .......... *H04W 64/003* (2013.01); *H04W 4/02* (2013.01); *H04W 4/029* (2018.02); *H04W 4/70* (2018.02); *H04W 64/00* (2013.01)

(58) Field of Classification Search
CPC ....... H04W 12/08; H04W 12/06; H04W 4/02; H04W 4/021; H04W 4/80; H04W 64/00;
(Continued)

(56) References Cited

U.S. PATENT DOCUMENTS 6,725,048 B2 4/2004 Mao et al.
6,985,747 B2 1/2006 Chithambaram
(Continued)

FOREIGN PATENT DOCUMENTS

CN 101455096 A 6/2009
CN 101493513 A 7/2009
(Continued)

OTHER PUBLICATIONS

3GPP TS 29.171, "3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLs interface (Release 13)", 3GPP TS 29.171 V13.0.0, 3rd Generation Partnership Project (3GPP), Mobile Competence Centre, 650, Route Des Lucioles, F-06921, Sophia-Antipolis Cedex, France, vol. CT WG4, No. V13.0 .0, Sep. 17, 2015, 51 pages.

(Continued)

*Primary Examiner* — Alison Slater
*Assistant Examiner* — Jing Gao
(74) *Attorney, Agent, or Firm* — QUALCOMM Incorporated

(57) ABSTRACT

Methods and techniques are described for supporting location services for a user equipment (UE) that is using Narrowband Internet of Things radio access or Cellular Internet of Things features to access a wireless network. The techniques include enabling support for a last known location of a UE, using previously obtained location measurements, when a UE is not reachable from a wireless network for positioning. The techniques also include limiting positioning protocol interaction between a UE and a location server via a reduced maximum message size, reduced message volume and longer response and retransmission timers. The tech- (Continued)

niques further include enabling a UE to obtain location measurements when not connected to a wireless network, enabling periodic and triggered location of a UE in which a UE evaluates location triggers while not connected to a wireless network, enabling use of deferred location and enabling improved location security.

14 Claims, 11 Drawing Sheets

Related U.S. Application Data

(60) Provisional application No. 62/377,654, filed on Aug. 21, 2016, provisional application No. 62/404,733, filed on Oct. 5, 2016.

(51) Int. Cl.
*H04W 4/029* (2018.01)
*H04W 4/70* (2018.01)

(58) Field of Classification Search
CPC ..... H04W 4/023; H04W 4/025; H04W 48/04; H04W 36/32; H04W 4/027; H04W 84/005; H04W 36/0005; H04W 36/34; H04W 76/11; H04W 76/19; H04W 4/029; H04W 4/90; H04W 64/003; H04W 84/12; H04W 52/0212; H04W 24/02; H04W 24/04; H04W 24/10; H04W 36/0016; H04W 76/10; H04W 36/14; H04W 28/0268; H04W 48/06; H04W 4/24; H04W 28/0284; H04W 28/20; H04W 36/165; H04W 36/18; H04W 36/20; H04W 52/40; H04W 72/04; H04W 72/0453; H04W 28/0226; H04W 28/26; H04W 36/08; H04W 40/20; H04W 48/18; H04W 52/0206; H04W 60/04

See application file for complete search history.

(56) References Cited

U.S. PATENT DOCUMENTS

| | | | |
|---|---|---|---|
| 7,209,757 B2 | 4/2007 | Naghian et al. | |
| 7,254,388 B2 | 8/2007 | Nam et al. | |
| 7,321,773 B2 | 1/2008 | Hines et al. | |
| 7,509,132 B2 | 3/2009 | Duan et al. | |
| 7,660,590 B2 | 2/2010 | Timiri et al. | |
| 7,764,961 B2 | 7/2010 | Zhu et al. | |
| 7,778,648 B2 * | 8/2010 | Ge | H04W 8/08 455/456.1 |
| 7,860,517 B1 | 12/2010 | Patoskie et al. | |
| 7,974,639 B2 | 7/2011 | Burroughs et al. | |
| 8,154,401 B1 | 4/2012 | Bertagna et al. | |
| 8,165,602 B2 | 4/2012 | Kim et al. | |
| 8,195,195 B2 | 6/2012 | Kim et al. | |
| 8,504,060 B2 | 8/2013 | Harindranath | |
| 8,526,945 B2 | 9/2013 | Knauft et al. | |
| 8,780,732 B2 | 7/2014 | Song et al. | |
| 9,125,018 B2 | 9/2015 | Wachter et al. | |
| 9,191,520 B2 | 11/2015 | Titus et al. | |
| 9,220,028 B2 | 12/2015 | Suzuki et al. | |
| 9,264,928 B2 | 2/2016 | Liu et al. | |
| 9,326,096 B1 | 4/2016 | Gatmir-Motahari et al. | |
| 9,591,679 B2 | 3/2017 | Bontu et al. | |
| 9,693,338 B2 | 6/2017 | Zhao et al. | |
| 9,781,259 B1 | 10/2017 | Kodaypak | |
| 9,955,373 B2 | 4/2018 | Siomina et al. | |
| 10,244,420 B2 | 3/2019 | Yamine et al. | |
| 10,341,893 B2 | 7/2019 | Siomina et al. | |
| 10,499,337 B1 | 12/2019 | Bart | |
| 10,715,951 B1 | 7/2020 | Ratasuk et al. | |
| 10,893,501 B1 | 1/2021 | Fong et al. | |
| 10,993,081 B2 | 4/2021 | Mehran et al. | |
| 11,096,036 B2 | 8/2021 | Poornachandran et al. | |
| 11,140,649 B2 | 10/2021 | Ryu et al. | |
| 11,700,517 B2 | 7/2023 | Zhao et al. | |
| 2002/0171673 A1 | 11/2002 | Brown et al. | |
| 2005/0123149 A1 | 6/2005 | Elko et al. | |
| 2005/0250516 A1 | 11/2005 | Shim | |
| 2006/0223490 A1 | 10/2006 | Kim et al. | |
| 2006/0293066 A1 | 12/2006 | Edge et al. | |
| 2007/0004429 A1 | 1/2007 | Edge et al. | |
| 2007/0015522 A1 | 1/2007 | Ruutu et al. | |
| 2007/0049288 A1 | 3/2007 | Lamprecht et al. | |
| 2007/0054675 A1 | 3/2007 | Duan | |
| 2007/0185985 A1 | 8/2007 | Shim et al. | |
| 2007/0232322 A1 | 10/2007 | Jagadeesan et al. | |
| 2008/0108374 A1 | 5/2008 | Xiong et al. | |
| 2009/0049154 A1 | 2/2009 | Ge | |
| 2009/0054035 A1 | 2/2009 | Kim et al. | |
| 2009/0167554 A1 | 7/2009 | Munje et al. | |
| 2009/0181698 A1 | 7/2009 | Farmer et al. | |
| 2010/0041418 A1 | 2/2010 | Edge et al. | |
| 2011/0053605 A1 | 3/2011 | Carpio et al. | |
| 2011/0053606 A1 | 3/2011 | Yao et al. | |
| 2011/0053613 A1 | 3/2011 | Zhou et al. | |
| 2011/0064046 A1 | 3/2011 | Zhu | |
| 2011/0096669 A1 | 4/2011 | Iovieno et al. | |
| 2011/0098048 A1 | 4/2011 | Zhang et al. | |
| 2011/0171974 A1 | 7/2011 | Kim et al. | |
| 2011/0176486 A1 | 7/2011 | Mahdi | |
| 2011/0256873 A1 | 10/2011 | Vikberg et al. | |
| 2012/0040681 A1 | 2/2012 | Yan et al. | |
| 2012/0147772 A1 | 6/2012 | Kazmi et al. | |
| 2012/0314604 A1 * | 12/2012 | Siomina | H04W 64/00 370/252 |
| 2013/0012232 A1 | 1/2013 | Titus et al. | |
| 2013/0027556 A1 | 1/2013 | Clark et al. | |
| 2013/0045756 A1 | 2/2013 | Busin et al. | |
| 2013/0193909 A1 | 8/2013 | Blevins | |
| 2013/0303164 A1 | 11/2013 | Seo | |
| 2013/0308481 A1 * | 11/2013 | Kazmi | H04W 24/02 370/252 |
| 2013/0310068 A1 * | 11/2013 | Fischer | G01S 19/05 455/456.1 |
| 2013/0324123 A1 | 12/2013 | Ianev et al. | |
| 2014/0073347 A1 | 3/2014 | Yongjin et al. | |
| 2014/0086164 A1 | 3/2014 | Kim et al. | |
| 2014/0092877 A1 | 4/2014 | Kazmi et al. | |
| 2014/0098690 A1 | 4/2014 | Siomina et al. | |
| 2014/0155101 A1 | 6/2014 | Wachter et al. | |
| 2014/0213269 A1 | 7/2014 | Nama et al. | |
| 2014/0244834 A1 | 8/2014 | Guedalia et al. | |
| 2014/0248901 A1 * | 9/2014 | Johnsson | H04W 8/005 455/456.1 |
| 2014/0362754 A1 | 12/2014 | Moses et al. | |
| 2015/0011239 A1 | 1/2015 | Quan et al. | |
| 2015/0065160 A1 | 3/2015 | Meredith et al. | |
| 2015/0126235 A1 | 5/2015 | Cho et al. | |
| 2015/0189502 A1 | 7/2015 | Meredith et al. | |
| 2015/0201318 A1 | 7/2015 | Singh et al. | |
| 2015/0229713 A1 | 8/2015 | Lu et al. | |
| 2015/0230057 A1 | 8/2015 | Jiang et al. | |
| 2015/0289127 A1 | 10/2015 | Ou et al. | |
| 2015/0296379 A1 | 10/2015 | Nix | |
| 2015/0304982 A1 | 10/2015 | Liao | |
| 2015/0327032 A1 | 11/2015 | Hedman et al. | |
| 2016/0100362 A1 * | 4/2016 | Palanisamy | H04W 52/0212 370/311 |
| 2016/0156513 A1 | 6/2016 | Zhang et al. | |
| 2016/0157056 A1 | 6/2016 | Kim et al. | |
| 2016/0205625 A1 | 7/2016 | Stojanovski et al. | |
| 2016/0227381 A1 | 8/2016 | Bargetzi et al. | |
| 2017/0150395 A1 | 5/2017 | Karlsson et al. | |
| 2017/0156055 A1 | 6/2017 | Zhang et al. | |
| 2017/0265211 A1 | 9/2017 | Elsayed et al. | |
| 2018/0041984 A1 | 2/2018 | Li et al. | |
| 2018/0054795 A1 * | 2/2018 | Edge | H04W 4/029 |
| 2018/0054796 A1 | 2/2018 | Edge | |
| 2018/0092017 A1 | 3/2018 | Freda et al. | |

(56) References Cited

U.S. PATENT DOCUMENTS

| | | | |
|---|---|---|---|
| 2018/0098279 | A1 | 4/2018 | Edge |
| 2018/0249528 | A1 | 8/2018 | Kuge et al. |
| 2019/0182794 | A1* | 6/2019 | Wong .................. H04W 64/00 |
| 2019/0229789 | A1 | 7/2019 | Zhang et al. |
| 2019/0254104 | A1 | 8/2019 | Gurumoorthy et al. |
| 2019/0349881 | A1 | 11/2019 | Choi et al. |
| 2020/0037345 | A1 | 1/2020 | Ryoo et al. |
| 2020/0154506 | A1 | 5/2020 | Liu |
| 2020/0229130 | A1 | 7/2020 | Keating et al. |
| 2020/0260240 | A1 | 8/2020 | Lee et al. |
| 2021/0014791 | A1 | 1/2021 | Freda et al. |
| 2021/0204351 | A1 | 7/2021 | Rayavarapu et al. |
| 2021/0227442 | A1 | 7/2021 | Yiu |
| 2021/0266833 | A1 | 8/2021 | Edge |
| 2021/0329416 | A1 | 10/2021 | Li et al. |
| 2021/0329443 | A1 | 10/2021 | Si et al. |
| 2022/0046661 | A1 | 2/2022 | Jeon et al. |
| 2022/0103976 | A1 | 3/2022 | Gummadi et al. |
| 2022/0256312 | A1 | 8/2022 | Kim et al. |
| 2022/0369069 | A1 | 11/2022 | Busin et al. |
| 2023/0133396 | A1 | 5/2023 | Edge |
| 2024/0147190 | A1 | 5/2024 | Gummadi et al. |
| 2025/0008302 | A1 | 1/2025 | Gummadi |

FOREIGN PATENT DOCUMENTS

| | | | | |
|---|---|---|---|---|
| CN | 101965033 | A | | 2/2011 |
| CN | 102111847 | A | | 6/2011 |
| CN | 102131217 | A | | 7/2011 |
| CN | 102340762 | A | | 2/2012 |
| CN | 102368875 | A | | 3/2012 |
| CN | 102413485 | A | * 4/2012 | ............ H04W 4/021 |
| CN | 102483458 | A | | 5/2012 |
| CN | 102860063 | A | | 1/2013 |
| CN | 103188751 | A | | 7/2013 |
| CN | 103354986 | A | | 10/2013 |
| CN | 103428748 | A | | 12/2013 |
| CN | 103517093 | A | | 1/2014 |
| CN | 103546984 | A | | 1/2014 |
| CN | 103581398 | A | | 2/2014 |
| CN | 103647822 | A | | 3/2014 |
| CN | 103686792 | A | | 3/2014 |
| CN | 103858512 | A | | 6/2014 |
| CN | 104978535 | A | | 10/2015 |
| CN | 110301143 | A | | 10/2019 |
| CN | 109891916 | B | | 1/2022 |
| EP | 2474838 | A1 | | 7/2012 |
| EP | 2606691 | B1 | | 12/2014 |
| EP | 3018945 | A1 | | 5/2016 |
| EP | 3497991 | A1 | | 6/2019 |
| JP | 2001128226 | A | | 5/2001 |
| JP | 2018507596 | A | | 3/2018 |
| WO | 2005117295 | A1 | | 12/2005 |
| WO | 2009024002 | A1 | | 2/2009 |
| WO | 2010091424 | A2 | | 8/2010 |
| WO | 2011130082 | A1 | | 10/2011 |
| WO | 2012047070 | A3 | | 6/2012 |
| WO | 2012152155 | A1 | | 11/2012 |
| WO | 2013062462 | A1 | | 5/2013 |
| WO | 2013111906 | A1 | | 8/2013 |
| WO | 2014134406 | A1 | | 9/2014 |
| WO | 2014146530 | A1 | | 9/2014 |
| WO | 2014194300 | A1 | | 12/2014 |
| WO | 2016126847 | A1 | | 8/2016 |
| WO | 2017058287 | A1 | | 4/2017 |

OTHER PUBLICATIONS

3rd Generation Partnership Project; Technical Specification Group Services and System Aspects; Functional stage 2 description of Location Services (LCS) (Release 13), 3GPP TS 23.271, 3rd Generation Partnership Project (3GPP), Mobile Competence Centre, 650, Route Des Lucioles, F-06921, Sophia-Antipolis Cedex, France, vol. SA WG2, No. V13.0.0, Sep. 15, 2015, XP050995999, pp. 1-172.

International Search Report and Written Opinion—PCT/US2017/039254—ISA/EPO—dated Dec. 7, 2017.

Partial International Search Report—PCT/US2017/039254—ISA/EPO—dated Sep. 14, 2017.

Qualcomm Incorporated : "Addition of Impacts and Evaluations for Location Services Solutions", 3GPP DRAFT; S2-166200 WAS6013 WAS5976 WAS5728 CIOT EX Evaluation of Location Enhancements for CIOT V3, 3rd Generation Partnership Project (3GPP), Mobile Competence Centre, 650, Route Des Lucioles, F-06921, Sophia-Antipolis Cedex, France, vol. SA WG2, No. Kaohsiung City, Taiwan; Oct. 24, 2016, XP051170138, Retrieved from the Internet: URL:http://www.3gpp.org/ftp/tsg_sa/WG2_Arch/TSG2_117_Kaohsiung_City/Docs/ [retrieved on Oct. 24, 2016, 13 pages.

Qualcomm Incorporated: "Addition of Periodic and Triggered Location for EPC Access", 3GPP DRAFT; S2-166688 (CR 23.271—Periodic and Triggered EPC-MT-LR), 3rd Generation Partnership Project (3GPP), Mobile Competence Centre, 650, Route Des Lucioles, F-06921, Sophia-Antipolis Cedex, France, vol. SA WG2, No. Reno, Nevada, USA; Nov. 8, 2016, XP051199657, Retrieved from the Internet: URL :http://www. 3gpp.org/ftp/tsg_sa/WG2_Arch/TSGS2_118_Reno/Docs/ [retrieved on Nov. 8, 2016], 20 pages.

Qualcomm Incorporated: "Key Issues and Solutions for Location Support for CIoT Devices—1", 3GPP DRAFT; S2-164846 WAS4489, 3rd Generation Partnership Project (3GPP), Mobile Competence Centre, 650, Route Des Lucioles, F-06921, Sophia-Antipolis Cedex, France, vol. SA WG2, No. Sanya, P.R. China; Sep. 3, 2016, XP051168915, Retrieved from the Internet: URL:http://www.3gpp.org/ftp/tsg_sa/WG2_Arch/TSGS2_116BIS_Sanya/Docs/ [retrieved on Sep. 3, 2016], 7 pages.

Qualcomm Incorporated: "Location Support for CIoT Devices", 3GPP DRAFT; S2-164488, 3rd Generation Partnership Project (3GPP), Mobile Competence Centre, 650, Route Des Lucioles, F-06921, Sophia-Antipolis Cedex, France, vol. SA WG2, No. Sanya, P.R. China; Aug. 27, 2016, XP051130475, Retrieved from the Internet: URL:http://www.3gpp.org/ftp/Meetings_3GPP_SYNC/SA2/Docs/ [retrieved on Aug. 27, 2016], 8 pages.

Taiwan Search Report—TW106121547—TIPO—Oct. 18, 2020.

3GPP TS 23.271: "3rd Generation Partnership Project; Technical Specification Group Services and System Aspects; Functional stage 2 Description of Location Services (LCS) (Release 12)", 3GPP TS 23.271 V12.1.0 (Jun. 2014), pp. 1-169.

3rd Generation Partnership Project; Technical Specification Group Services and System Aspects; Study on Extended Architecture Support for Cellular Internet of Things (Release 14), 3GPP TR 23.730 V0.1.0 (Jul. 2016), Aug. 17, 2016, 27 Pages.

3rd Generation Partnership Project; Technical Specification Group Services and System Aspects; Study on Extended Architecture Support for Cellular Internet of Things (Release 14), 3GPP TR 23.730 V0.2.0 (Sep. 2016), Sep. 16, 2016, 55 Pages.

Taiwan Search Report—TW106121547—TIPO—Feb. 22, 2021.

TSG CT WG1: "CRs to Rel-7 WI "EGCS" for TSs 43.068 and 43.069", 3GPP TSG CT Meeting #28, CP-050073, (May 24, 2005), Jun. 1-3, 2005, Quebec, Canada, 1 Page.

Woqi M., "NB-IoT Opens Up New Opportunities in Development of the Internet of Things Industry", Computer Knowledge and Technology, Jul. 20, 2016, 3 pages.

Liping S., "Analysis of LTE Technology-Based Internet of Things Technology", Silicon Valley Issue 8, Apr. 23, 2013.

Muyin L., et al., "Research on Internet of Things Congestion Control Solutions Based on Mobile Network", China Internet Issue 9, Sep. 15, 2013.

ETSI TS 123 271, "Digital Cellular Telecommunications System (Phase 2+) (GSM); Universal Mobile Telecommunications System (UMTS); LTE; Functional Stage 2 Description of Location Services (LCS) (3GPP TS 23.271 version 14.2.0 Release 14)", ETSI TS 123 271, V14.2.0, pp. 29-31, Jul. 2017, 187 Pages.

ETSI TS 123 271, "Digital Cellular Telecommunications System (Phase 2+); Universal Mobile Telecommunications System (UMTS); LTE; Functional Stage 2 Description of Location Services (LCS)

(56) References Cited

OTHER PUBLICATIONS (3GPP TS 23.271 version 10.4.0 Release 10)", ETSI TS 123 271, V10.4.0, pp. 27-29, Apr. 2013, 171 Pages.
ETSI TS 123 401, "LTE; General Packet Radio Service (GPRS) Enhancements for Evolved Universal Terrestrial Radio Access Network (E-UTRAN) Access (3GPP TS 23.401 version 12.6.0 Release 12)", ETSI TS 123 401, V12.6.0, pp. 135-138, Sep. 2014, 308 Pages.
European Search Report—EP20173887—Search Authority—The Hague—Oct. 9, 2020.
Qualcomm Incorporated: "Triggered Location Information Transfer due to Cell Change", Change Request 36.355 CR 0016 rev; v.9.0.0, R2-101788, 3GPP TSG RAN WG2 Meeting #69, Feb. 22-26, 2010, San Francisco, California, USA, pp. 1-4.
3GPP TS 23.730: 3rd Generation Partnership Project, Technical Specification Group Services and System Aspects, Study on Extended Architecture Support for Cellular Internet of Things (Release 14), V1.2.0 (Oct. 2016), 3GPP, 76 Pages, Oct. 31, 2016.

* cited by examiner

METHODS AND SYSTEMS FOR SUPPORT OF LOCATION FOR THE INTERNET OF THINGS

CROSS-REFERENCE TO RELATED APPLICATIONS

This application is a continuation of U.S. Non-Provisional application Ser. No. 15/409,454, filed Jan. 18, 2017, and entitled "METHODS AND SYSTEMS FOR SUPPORT OF LOCATION FOR THE INTERNET OF THINGS," which claims the benefit of and priority to U.S. Provisional Application No. 62/377,654, filed Aug. 21, 2016, and entitled "LOCATION SUPPORT FOR CIoT AND NB-IoT DEVICES" and to U.S. Provisional Application No. 62/404,733, filed Oct. 5, 2016, and entitled "LOCATION SUPPORT FOR CIoT AND NB-IoT DEVICES," all of which are assigned to the assignee hereof and are incorporated herein by reference in their entireties.

BACKGROUND

Background Field

The present disclosure relates generally to communication, and more specifically to techniques for supporting location services (LCS) for user equipments (UEs) that may be part of or may be treated as being part of the Internet of Things (IoT).

Relevant Background

The $3^{rd}$ Generation Partnership Project (3GPP) has defined specifications that provide support for wireless communication involving Machine Type Communications (MTC), Internet of Things (IoT), Cellular IoT (CIoT) and Narrow Band IoT (NB-IoT). The NB-IoT is a Radio Access Type (RAT), supported by the evolved UMTS Terrestrial Radio Access Network (E-UTRAN), that was added by 3GPP in specifications for 3GPP Release 13 to provide 180 KHz UL/DL (Uplink/Downlink) bandwidth. The CIoT concerns EPC (evolved packet core) support for NB-IoT, IoT and MTC and is complimentary to NB-IoT (i.e., NB-IoT is primarily concerned with E-UTRAN and CIoT is primarily concerned with the EPC).

Support for NB-IoT and CIoT in 3GPP Release 13 introduces a number of restrictions and limitations that may degrade and/or block location services (LCS) for a user equipment (UE) when existing location solutions are used. For example, limitations that may degrade and potentially block existing location solutions may include: (1) long periods (e.g. several hours) during which a UE may be unreachable for positioning; (2) unpredictable availability of a UE for positioning after a period of unreachability; (3) a limitation on message size and/or message volume for signaling to and from a UE; (4) long message delivery delay (e.g. several seconds) across the NB-IoT radio interface; and/or (5) potential inability of a UE to obtain location measurements. Despite these limitations, positioning support for UEs with NB-IoT radio access and UEs being supported as part of CIoT may be important for both users and wireless network operators since NB-IoT devices may need to be located occasionally or frequently at short notice and/or with high reliability and/or high accuracy. For example, NB-IoT or CIoT UEs associated with tracking or monitoring devices for assets, people or pets or associated with control devices for movable objects such as portable air conditioners, robotic vacuum cleaners and lawn mowers, and drones etc. may need to be positioned precisely and without excessive delay. Therefore, solutions to remove or mitigate limitations and restrictions on location support for NB-IoT and CIoT UEs are needed.

SUMMARY

Location services for user equipments (UEs) that support a Narrowband Internet of Things (NB-IoT) radio access type or Cellular Internet of Things (CIoT) network features may be supported by certain positioning interactions with a location server in response to an indication to the location server that the UE supports an NB-IOT radio access type or CIoT network features. The positioning interactions may use a reduced maximum positioning message size, longer retransmission and response timers, a restricted size of assistance data, or a reduced number of location measurements. Location measurements received from a UE may be used for a determination of a last known location of the UE when the UE is not wirelessly connected to a network. The UE may engage in a positioning session with a location server when in a connected state, defer performing location measurements until the UE is no longer in the connected state, and provide the location measurements for the positioning session after re-entering the connected state. The UE may further receive a mobile terminated location request including a trigger evaluation interval, a periodic maximum reporting interval trigger, and one or more location triggers, where the location triggers are evaluated when the UE is not in the connected state. When a trigger condition occurs, the UE re-enters a connected state and initiates a location session.

In one implementation, a method includes receiving by a location server an indication that a user equipment (UE) is using Narrowband Internet of Things (NB-IoT) radio access or Cellular Internet of Things (CIoT) features; and limiting positioning interaction with the UE in response to the indication that the UE is using NB-IOT radio access or CIoT features, wherein limiting the positioning interaction comprises at least one of using a reduced maximum positioning message size, using longer retransmission and response timers, using a restricted size of assistance data, or requesting a reduced number of location measurements from the UE, each relative to positioning interaction for another UE with a non-NB-IoT radio access and non-CIoT features.

In one implementation, a location server includes an external interface configured to receive an indication that a user equipment (UE) is using Narrowband Internet of Things (NB-IoT) radio access or Cellular Internet of Things (CIoT) features; and at least one processor configured to limit positioning interaction with the UE in response to the indication that the UE is using NB-IOT radio access or CIoT features, wherein limiting the positioning interaction comprises at least one of using a reduced maximum positioning message size, using longer retransmission and response timers, using a restricted size of assistance data, or requesting a reduced number of location measurements from the UE, each relative to positioning interaction for another UE with a non-NB-IoT radio access and non-CIoT features.

In one implementation, a location server includes means for receiving an indication that a user equipment (UE) is using Narrowband Internet of Things (NB-IoT) radio access or Cellular Internet of Things (CIoT) features; and means for limiting positioning interaction with the UE in response to the indication that the UE is using NB-IOT radio access or CIoT features, wherein limiting the positioning interaction comprises at least one of using a reduced maximum positioning message size, using longer retransmission and response timers, using a restricted size of assistance data, or requesting a reduced number of location measurements from the UE, each relative to positioning interaction for another UE with a non-NB-IoT radio access and non-CIoT features.

In one implementation, a non-transitory computer readable medium has stored therein computer executable instructions executable by one or more processors of a location server to: receive an indication that a user equipment (UE) is using Narrowband Internet of Things (NB-IoT) radio access or Cellular Internet of Things (CIoT) features; and limit positioning interaction by the location server with the UE in response to the indication that the UE is using NB-IOT radio access or CIoT features, wherein limiting the positioning interaction comprises at least one of using a reduced maximum positioning message size, using longer retransmission and response timers, using a restricted size of assistance data, or requesting a reduced number of location measurements from the UE, each relative to positioning interaction for another UE with a non-NB-IoT radio access and non-CIoT features.

In one implementation, a method includes receiving location measurements for a user equipment (UE) that is using Narrowband Internet of Things (NB-IoT) radio access or Cellular Internet of Things (CIoT) features to access a wireless network; storing the location measurements and a timestamp; receiving a location request for the UE when the UE is not connected to the wireless network; transmitting the location measurements to a location server with an indication that the UE is not connected to the wireless network; and receiving a response from the location server comprising a last known location for the UE.

In one implementation, an apparatus includes an external interface configured to receive location measurements for a user equipment (UE) that is using Narrowband Internet of Things (NB-IoT) radio access or Cellular Internet of Things (CIoT) features to access a wireless network; memory configured to store the location measurements and a timestamp; and at least one processor configured to receive with the external interface a location request for the UE when the UE is not connected to the wireless network; cause the external interface to transmit the location measurements to a location server with an indication that the UE is not connected to the wireless network; and receive with the external interface a response from the location server comprising a last known location for the UE.

In one implementation, an apparatus includes means for receiving location measurements for a user equipment (UE) that is using Narrowband Internet of Things (NB-IoT) radio access or Cellular Internet of Things (CIoT) features to access a wireless network; means for storing the location measurements and a timestamp; means for receiving a location request for the UE when the UE is not connected to the wireless network; means for transmitting the location measurements to a location server with an indication that the UE is not connected to the wireless network; and means for receiving a response from the location server comprising a last known location for the UE.

In one implementation, a non-transitory computer readable medium has stored therein computer executable instructions executable by one or more processors to: receive location measurements for a user equipment (UE) that is using Narrowband Internet of Things (NB-IoT) radio access or Cellular Internet of Things (CIoT) features to access a wireless network; store the location measurements and a timestamp; receive a location request for the UE when the UE is not connected to the wireless network; transmit the location measurements to a location server with an indication that the UE is not connected to the wireless network; and receive a response from the location server comprising a last known location for the UE.

In one implementation, a method comprises: entering a connected state with a wireless network by a user equipment (UE) that is using Narrowband Internet of Things (NB-IoT) radio access or Cellular Internet of Things (CIoT) features; engaging in a positioning session with a location server; receiving a request for location measurements from the location server; deferring performing the location measurements until the UE is not in the connected state with the wireless network; entering an idle state wherein the UE is not connected with the wireless network, obtaining the location measurements while in the idle state; re-entering the connected state with the wireless network; and providing the location measurements to the location server.

In one implementation, a user equipment, that uses Narrowband Internet of Things (NB-IoT) radio access or Cellular Internet of Things (CIoT) features, comprises: a wireless transceiver configured to wirelessly communicate with a wireless network; and at least one processor configured to enter a connected state with the wireless network with the wireless transceiver, engage in a positioning session with a location server, receive with the wireless transceiver a request for location measurements from the location server; defer performing the location measurements until the UE is not in the connected state with the wireless network, enter an idle state wherein the UE is not connected with the wireless network, obtain the location measurements while in the idle state, re-enter the connected state with the wireless network, and provide the location measurements to the location server.

In one implementation, a user equipment, that uses Narrowband Internet of Things (NB-IoT) radio access or Cellular Internet of Things (CIoT) features, comprises: means for entering a connected state with a wireless network; means for engaging in a positioning session with a location server; means for receiving a request for location measurements from the location server; means for deferring performing the location measurements until the UE is not in the connected state with the wireless network; means for entering an idle state wherein the UE is not connected with the wireless network, means for obtaining the location measurements while in the idle state; means for re-entering the connected state with the wireless network; and means for providing the location measurements to the location server.

In one implementation, a non-transitory computer readable medium has stored therein computer executable instructions executable by one or more processors of a user equipment that uses Narrowband Internet of Things (NB-IoT) radio access or Cellular Internet of Things (CIoT) features to: enter a connected state with a wireless network; engage in a positioning session with a location server; receive a request for location measurements from the location server; defer performing the location measurements until the UE is not in the connected state with the wireless network; enter an idle state wherein the UE is not connected with the wireless network, obtain the location measurements while in the idle state; re-enter the connected state with the wireless network; and provide the location measurements to the location server.

In one implementation, a method comprises: receiving a mobile terminated location request from a wireless network by a user equipment (UE) while the UE is in a connected state with the wireless network, the mobile terminated location request comprising a trigger evaluation interval, a periodic maximum reporting interval trigger, and one or more location triggers; evaluating the one or more location triggers at the trigger evaluation interval while the UE is not in the connected state; re-entering the connected state with the wireless network when a trigger condition is detected or when the periodic maximum reporting interval trigger occurs; and initiating or re-initiating a location session with the wireless network after re-entering the connected state.

In one implementation, a user equipment (UE) comprises: a wireless transceiver configured to wirelessly communicate with a wireless network; and at least one processor configured to receive a mobile terminated location request from the wireless network while the UE is in a connected state with the wireless network, the mobile terminated location request comprising a trigger evaluation interval, a periodic maximum reporting interval trigger, and one or more location triggers, evaluate the one or more location triggers at the trigger evaluation interval while the UE is not in the connected state, re-enter the connected state with the wireless network when a trigger condition is detected or when the periodic maximum reporting interval trigger occurs, and initiate or re-initiate a location session with the wireless network after re-entering the connected state.

In one implementation, a user equipment (UE) comprises: means for receiving a mobile terminated location request from a wireless network while the UE is in a connected state with the wireless network, the mobile terminated location request comprising a trigger evaluation interval, a periodic maximum reporting interval trigger, and one or more location triggers; means for evaluating the one or more location triggers at the trigger evaluation interval while the UE is not in the connected state; means for re-entering the connected state with the wireless network when a trigger condition is detected or when the periodic maximum reporting interval trigger occurs; and means for initiating or re-initiating a location session with the wireless network after re-entering the connected state.

In one implementation, a non-transitory computer readable medium has stored therein computer executable instructions executable by one or more processors of a user equipment (UE) to: receive a mobile terminated location request from a wireless network while the UE is in a connected state with the wireless network, the mobile terminated location request comprising a trigger evaluation interval, a periodic maximum reporting interval trigger, and one or more location triggers; evaluate the one or more location triggers at the trigger evaluation interval while the UE is not in the connected state; re-enter the connected state with the wireless network when a trigger condition is detected or when the periodic maximum reporting interval trigger occurs; and initiate or re-initiate a location session with the wireless network after re-entering the connected state.

In one implementation, a method includes receiving a location request for a user equipment (UE) that is using Narrowband Internet of Things (NB-IoT) radio access or Cellular Internet of Things (CIoT) features, wherein the location request comprises location measurements for the UE and an indication that the UE is not connected to a wireless network; determining a last known location for the UE based on the location measurements; and returning a location response comprising the last known location for the UE.

In one implementation, an apparatus includes an external interface configured to receive a location request for a user equipment (UE) that is using Narrowband Internet of Things (NB-IoT) radio access or Cellular Internet of Things (CIoT) features, wherein the location request comprises location measurements for the UE and an indication that the UE is not connected to a wireless network; and at least one processor configured to determine a last known location for the UE based on the location measurements, and cause the external interface to return a location response comprising the last known location for the UE.

In one implementation, an apparatus includes means for receiving a location request for a user equipment (UE) that is using Narrowband Internet of Things (NB-IoT) radio access or Cellular Internet of Things (CIoT) features, wherein the location request comprises location measurements for the UE and an indication that the UE is not connected to a wireless network; means for determining a last known location for the UE based on the location measurements; and means for returning a location response comprising the last known location for the UE.

In one implementation, a non-transitory computer readable medium has stored therein computer executable instructions executable by one or more processors to: receive a location request for a user equipment (UE) that is using Narrowband Internet of Things (NB-IoT) radio access or Cellular Internet of Things (CIoT) features, wherein the location request comprises location measurements for the UE and an indication that the UE is not connected to a wireless network; determine a last known location for the UE based on the location measurements; and return a location response comprising the last known location for the UE.

In one implementation, a method includes engaging in a positioning session with a user equipment (UE) that is using Narrowband Internet of Things (NB-IoT) radio access or Cellular Internet of Things (CIoT) features to access a wireless network; receiving an indication that the UE will defer performing location measurements for the positioning session until the UE is not in a connected state with the wireless network; sending a request for location measurements to the UE, wherein the request for location measurements comprises an increased maximum response time that is higher than a maximum response time for another UE for which the indication was not received; receiving the requested location measurements from the UE prior to expiration of the increased maximum response time; and determining a location for the UE based on the received location measurements.

In one implementation, an apparatus includes an external interface configured to communicate with a wireless network; and at least one processor configured to engage in a positioning session with a user equipment (UE) that is using Narrowband Internet of Things (NB-IoT) radio access or Cellular Internet of Things (CIoT) features to access the wireless network, receive an indication that the UE will defer performing location measurements for the positioning session until the UE is not in a connected state with the wireless network, cause the external interface to send a request for location measurements to the UE, wherein the request for location measurements comprises an increased maximum response time that is higher than a maximum response time for another UE for which the indication was not received, receive the requested location measurements from the UE prior to expiration of the increased maximum response time, and determine a location for the UE based on the received location measurements.

In one implementation, an apparatus includes means for engaging in a positioning session with a user equipment (UE) that is using Narrowband Internet of Things (NB-IoT)

radio access or Cellular Internet of Things (CIoT) features to access a wireless network; means for receiving an indication that the UE will defer performing location measurements for the positioning session until the UE is not in a connected state with the wireless network; means for sending a request for location measurements to the UE, wherein the request for location measurements comprises an increased maximum response time that is higher than a maximum response time for another UE for which the indication was not received; means for receiving the requested location measurements from the UE prior to expiration of the increased maximum response time; and means for determining a location for the UE based on the received location measurements.

In one implementation, a non-transitory computer readable medium has stored therein computer executable instructions executable by one or more processors to: engage in a positioning session with a user equipment (UE) that is using Narrowband Internet of Things (NB-IoT) radio access or Cellular Internet of Things (CIoT) features to access a wireless network; receive an indication that the UE will defer performing location measurements for the positioning session until the UE is not in a connected state with the wireless network; send a request for location measurements to the UE, wherein the request for location measurements comprises an increased maximum response time that is higher than a maximum response time for another UE for which the indication was not received; receive the requested location measurements from the UE prior to expiration of the increased maximum response time; and determine a location for the UE based on the received location measurements.

BRIEF DESCRIPTION OF THE DRAWINGS

An understanding of the nature and advantages of various embodiments may be realized by reference to the following figures.

Like numbered elements and entities in different figures may correspond to one another. For example, UE 102, eNB 104, MME 108, E-SMLC 110 and GMLC 116 in FIGS. 1, 2 and 3 may refer to the same set of entities.

DETAILED DESCRIPTION

Devices that form part of the so called Internet of Things (IoT) may be mobile and may be powered by batteries with a long life expectancy (e.g. 5 to 10 years) or with a requirement for infrequent recharging. Such devices may support wireless communication according to different radio access types such as Long Term Evolution (LTE), Narrowband LTE also referred to as Narrowband IoT (NB-IoT), IEEE 802.11 WiFi, Fifth Generation (5G). In order to (a) reduce wireless network subscription costs, which may in some cases be prepaid when an IoT device is purchased, (b) enable support of massive numbers of IoT devices by wireless network operators, and (c) enable longer battery life or longer intervals between battery recharging, it may be desirable or essential to limit the frequency and/or amount of wireless signaling between IoT devices and wireless networks. This may lead to restrictions on how often an IoT device can connect to or be accessed by a wireless network, which may in turn limit the responsiveness, reliability and accuracy of location support for IoT devices.

As an example, support for NB-IoT and CIoT devices in 3GPP Release 13 has introduced a number of restrictions and limitations that may degrade and/or block location services for a user equipment (UE) when existing location solutions are used. Limitations that may degrade and potentially block existing location solutions may include: (1) long periods (e.g. several hours) during which a UE may be unreachable for positioning; (2) unpredictable availability of a UE for positioning after a period of unreachability; (3) a limitation on message size and/or message volume for signaling to and from a UE; (4) long message delivery delay (e.g. several seconds) across the NB-IoT radio interface; and/or (5) potential inability of a UE to obtain location measurements (e.g. when connected to a wireless network). Despite these limitations, positioning support for UEs with NB-IoT radio access and UEs supported as part of CIoT may be important for both users and wireless network operators since NB-IoT devices may need to be located occasionally or frequently at short notice and/or with high reliability and/or high accuracy. For example, NB-IoT or CIoT UEs associated with tracking or monitoring devices for assets, people or pets or associated with control devices for movable objects such as portable air conditioners, robotic vacuum cleaners and lawn mowers, and drones etc. may need to be positioned precisely and without excessive delay. Therefore, solutions to remove or mitigate limitations and restrictions on location support for NB-IoT and CIoT UEs are needed.

Figure 1:
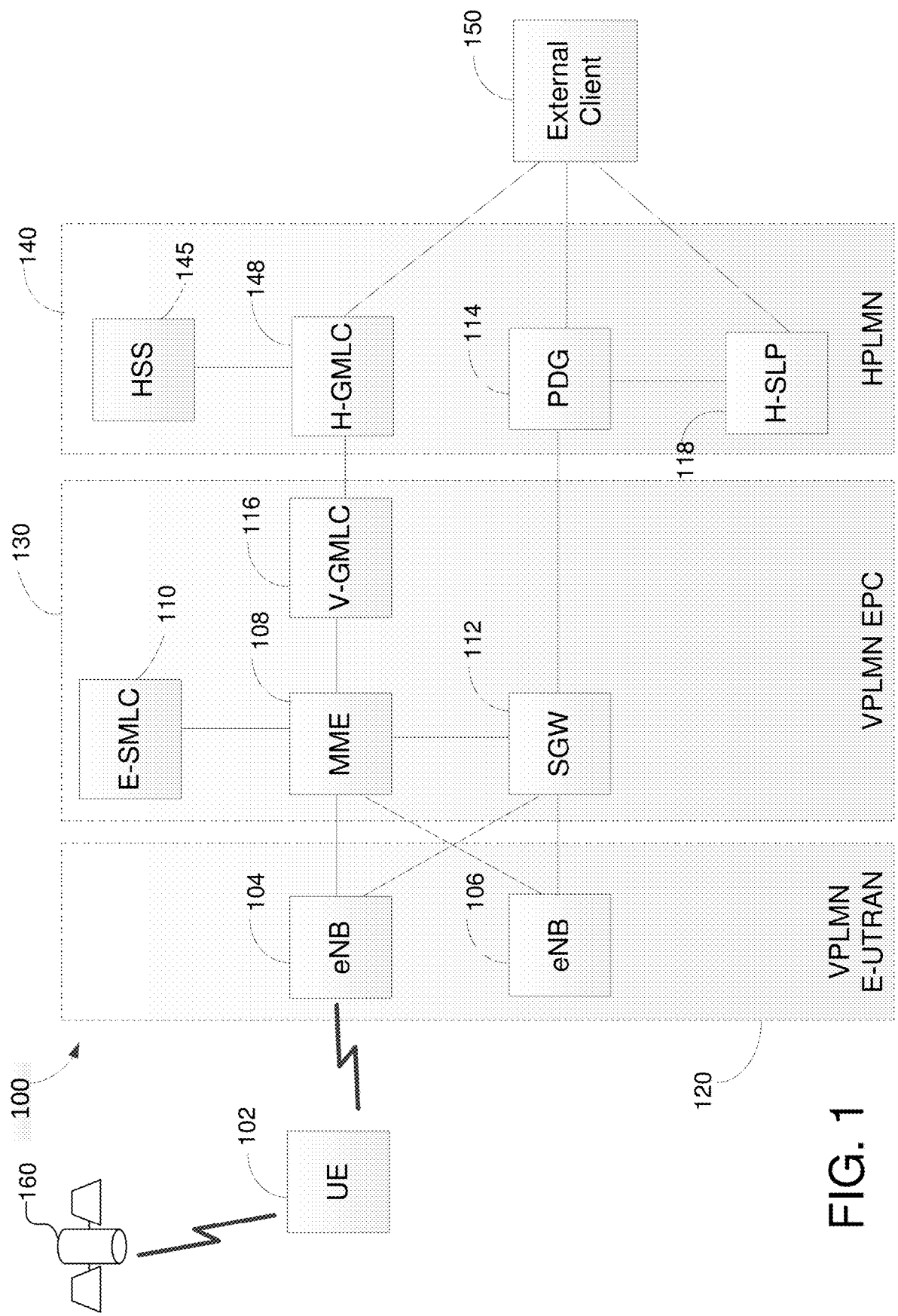
FIG. 1 is a simplified block diagram illustrating the architecture of a system for enabling support of location for NB-IoT and CIoT devices, according to an embodiment.

FIG. 1 is a diagram illustrating a network architecture 100 for location support of a user equipment (UE) 102 that supports and is currently using NB-IoT radio access or Long Term Evolution (LTE) radio access with CIoT operational features. The network architecture 100 may be referred to as an Evolved Packet System (EPS). As illustrated, the network architecture 100 may include the UE 102, an Evolved Universal Mobile Telecommunications Service (UMTS) Terrestrial Radio Access Network (E-UTRAN) 120, and an Evolved Packet Core (EPC) 130. The E-UTRAN 120 and the EPC 130 may be part of a Visited Public Land Mobile Network (VPLMN) that is a serving network for the UE 102 and communicates with a Home Public Land Mobile Network (HPLMN) 140 for the UE 102. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the network architecture 100 provides packet-switched services to the UE 102. However, as those skilled in the art will readily appreciate, the various concepts presented throughout this disclosure may be extended to networks providing circuit-switched services.

The UE 102 may be any electronic device configured for NB-IoT, CIoT and/or LTE radio access. The UE 102 may be referred to as a device, a wireless device, a mobile terminal, a terminal, a mobile station (MS), a mobile device, a Secure User Plane Location (SUPL) Enabled Terminal (SET) or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 102 may comprise a single entity or may comprise multiple entities such as in a personal area network where a user may employ audio, video and/or data I/O devices and/or body sensors and a separate wireline or wireless modem. Typically, though not necessarily, a UE 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), WiMax, etc. VPLMN EPC 130 combined with VPLMN E-UTRAN 120, and HPLMN 140, may be examples of a WWAN. A UE 102 may also support wireless communication with one or more types of Wireless Local Area Network (WLAN) such as a WLAN supporting IEEE 802.11 WiFi or Bluetooth® (BT). UE 102 may also support communication with one or more types of wireline network such as by using a Digital Subscriber Line (DSL) or packet cable for example. Although FIG. 1 shows only one UE 102, there may be many other UEs that can each correspond to UE 102.

The UE 102 may enter a connected state with a wireless communication network that may include the E-UTRAN 120. In one example, UE 102 may communicate with a cellular communication network by transmitting wireless signals to, and/or receiving wireless signals from, a cellular transceiver, such as an evolved Node B (eNB) 104 in the E-UTRAN 120. The E-UTRAN 120 may include one or more additional eNBs 106. The eNB 104 provides user plane and control plane protocol terminations toward the UE 102. The eNB 104 may be a serving eNB for UE 102 and may also be referred to as a base station, a base transceiver station, a radio base station, a radio transceiver, a radio network controller, a transceiver function, a base station subsystem (BSS), an extended service set (ESS), or by some other suitable terminology. The UE 102 also may transmit wireless signals to, or receive wireless signals from, a local transceiver (not shown in FIG. 1), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication include NB-IoT, but may further include GSM, CDMA, WCDMA, LTE, HRPD, eMTC and future Fifth Generation (5G) radio types. NB-IoT, CIoT, GSM, WCDMA, LTE, eMTC and 5G are technologies defined by (or expected to be defined by) 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 are connected by an interface (e.g. the 3GPP S1 interface) to the VPLMN EPC 130. The EPC 130 includes a Mobility Management Entity (MME) 108, and a Serving Gateway (SGW) 112 through which data (e.g. Internet Protocol (IP) packets) to and from the UE 102 may be transferred. The MME 108 may be the serving MME for UE 102 and is then the control node that processes the signaling between the UE 102 and the EPC 130 and supports attachment and network connection of UE 102, mobility of UE 102 (e.g. via handover between network cells) as well as establishing and releasing data bearers on behalf of the UE 102. The MME 108 may also support User Plane (UP) data transfer to and from the UE 102 using a 3GPP CIoT feature known as CIoT Control Plane (CP) optimization in which data packets are transferred to and from the UE via the MME 108, rather than by bypassing the MME 108, in order to avoid the overhead of establishing and releasing data bearers for the UE 102. Generally, the MME 108 provides bearer and connection management for the UE 102 and may be connected to the SGW 112, the eNBs 104 and 106, an Enhanced Serving Mobile Location Center (E-SMLC) 110 and a Visited Gateway Mobile Location Center (V-GMLC) 116 in the VPLMN EPC 130.

The E-SMLC 110 may support location of the UE 102 using the 3GPP control plane (CP) location solution defined in 3GPP technical specifications (TSs) 23.271 and 36.305. The V-GMLC 116, which may also be referred to simply as a Gateway Mobile Location Center (GMLC) 116, may provide access on behalf of an external client (e.g. external client 150) or another network (e.g. HPLMN 140) to the location of UE 102. The external client 150 may be a web server or remote application that may have some association with UE 102 (e.g. may be accessed by a user of UE 102 via VPLMN E-UTRAN 120, VPLMN EPC 130 and HPLMN 140) or may be a server, application or computer system providing a location service to some other user or users which may include obtaining and providing the location of UE 102 (e.g. to enable a service such as friend or relative finder, asset tracking or child or pet location).

As illustrated, the HPLMN 140 includes a Home Gateway Mobile Location Center (H-GMLC) 148 that may be connected to the V-GMLC 116 (e.g. via the Internet), as well as a Packet Data Network Gateway (PDG) 114 that may be connected to the SGW 112 (e.g. via the Internet). The PDG 114 may provide UE 102 with Internet Protocol (IP) address allocation and IP and other data access to external networks (e.g. the Internet) and to external clients (e.g. external client 150) and external servers, as well as other data transfer related functions. In some cases, PDG 114 may be located in VPLMN EPC 130 and not in HPLMN 140 when the UE 102 receives local IP breakout. The PDG 114 may be connected to a location server, such as a Home Secure User Plane Location (SUPL) Location Platform (H-SLP) 118. The H-SLP 118 may support the SUPL UP location solution defined by the Open Mobile Alliance (OMA) and may support location services for UE 102 based on subscription information for UE 102 stored in H-SLP 118. In some embodiments of network architecture 100, a Discovered SLP (D-SLP) or Emergency SLP (E-SLP) (not shown in FIG. 1), in or accessible from VPLMN EPC 130, may be used to locate UE 102 using the SUPL UP solution.

The H-GMLC 148 may be connected to a Home Subscriber Server (HSS) 145 for UE 102, which is a central database that contains user-related and subscription-related information for UE 102. The H-GMLC 148 may provide location access to the UE 102 on behalf of external clients such as external client 150. One or more of the H-GMLC 148, PDG 114, and H-SLP 118 may be connected to the external client 150, e.g., through another network, such as the Internet. In some cases, a Requesting GMLC (R-GMLC) located in another PLMN (not shown in FIG. 1) may be connected to H-GMLC 148 (e.g. via the Internet) in order to provide location access to UE 102 on behalf of external clients connected to the R-GMLC. The R-GMLC, H-GMLC 148 and V-GMLC 116 may support location access to the UE 102 using the 3GPP CP solution defined in 3GPP TS 23.271.

It should be understood that while a VPLMN network (comprising VPLMN E-UTRAN 120 and VPLMN EPC 130) and a separate HPLMN 140 are illustrated in FIG. 1; both PLMNs (networks) may be the same PLMN. In that case, (i) the H-SLP 118, PDG 114, and HSS 145, will be in the same network (EPC) as the MME 108, and (ii) the V-GMLC 116 and the H-GMLC 148 may be the same GMLC.

In particular implementations, the UE 102 may have circuitry and processing resources capable of obtaining location related measurements (also referred to as location measurements), such as measurements for signals received from GPS or other Satellite Positioning System (SPS) space vehicles (SVs) 160, measurements for cellular transceivers such as eNBs 104 and 106, and/or measurements for local transceivers. UE 102 may further have circuitry and processing resources capable of computing a position fix or estimated location of UE 102 based on these location related measurements. In some implementations, location related measurements obtained by UE 102 may be transferred to a location server, such as the E-SMLC 110 or H-SLP 118, after which the location server may estimate or determine a location for UE 102 based on the measurements.

Location related measurements obtained by UE 102 may include measurements of signals received from SVs 160 belonging to an SPS or Global Navigation Satellite System (GNSS) such as GPS, GLONASS, Galileo or Beidou and/or may include measurements of signals received from terrestrial transmitters fixed at known locations (e.g., such as eNB 104, eNB 106 or other local transceivers). UE 102 or a separate location server (e.g. E-SMLC 110 or H-SLP 118) may then obtain a location estimate for the UE 102 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi, or combinations thereof. In some of these techniques (e.g. A-GNSS, AFLT and OTDOA), pseudoranges or timing differences may be measured by UE 102 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 102. Here, location servers, such as E-SMLC 110 or H-SLP 118, may be capable of providing positioning assistance data to UE 102 including, for example, information regarding signals to be measured by UE 102 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA and ECID. The facilitation may include improving signal acquisition and measurement accuracy by UE 102 and/or, in some cases, enabling UE 102 to compute its estimated location based on the location measurements. For example, location servers may comprise an almanac (e.g. a Base Station Almanac (BSA)) which indicates the locations and identities of cellular transceivers and transmitters (e.g. eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 102 may obtain measurements of signal strength (e.g. received signal strength indication (RSSI) or reference signal received power (RSRP)) for signals received from cellular transceivers (e.g., eNBs 104, 106) and/or local transceivers and/or may obtain a signal to noise ratio (S/N), a reference signal received quality (RSTQ), or a round trip signal propagation time (RTT) between UE 102 and a cellular transceiver (e.g., eNB 104 or 106) or a local transceiver. A UE 102 may transfer these measurements to a location server, such as E-SMLC 110 or H-SLP 118, to determine a location for UE 102, or in some implementations, UE 102 may use these measurements together with assistance data (e.g. terrestrial almanac data or GNSS SV data such as GNSS Almanac and/or GNSS Ephemeris information) received from the location server to determine a location for UE 102.

In the case of OTDOA, UE 102 may measure a Reference Signal Time Difference (RSTD) between signals, such as a Position Reference Signal (PRS) or Common Reference Signal (CRS), received from nearby transceivers or base stations (e.g. eNBs 104 and 106). An RSTD measurement may provide the time of arrival difference between signals (e.g. CRS or PRS) received at UE 102 from two different transceivers (e.g. an RSTD between signals received from eNB 104 and from eNB 106). The UE 102 may return the measured RSTDs to a location server (e.g. E-SMLC 110 or H-SLP 118) which may compute an estimated location for UE 102 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 102 may be referred to as a location, location estimate, location fix, fix, position, position estimate or position fix, and may be geodetic, thereby providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of a UE 102 may also include an uncertainty and may then be expressed as an area or volume (defined either geodetically or in civic form) within which the UE 102 is expected to be located with some given or default probability or confidence level (e.g., 67% or 95%). A location of a UE 102 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 102 or by another entity such as eNB 104) that are used to determine (e.g. calculate) a location estimate for UE 102 may be referred to as measurements, location measurements, location related measurements, positioning measurements or position measurements and the act of determining a location for the UE 102 may be referred to as positioning of the UE 102 or locating the UE 102.

Conventional support for NB-IoT and CIoT includes a number of restrictions and limitations that may degrade and/or block location services for UEs. The network architecture 100 and UE 102 of FIG. 1 may be configured to perform one or more techniques to mitigate or eliminate the restrictions and limitations found in conventional systems. Examples of several of the one or more techniques that may be performed within the network architecture 100 or by UE 102 to improve location support for UEs supporting or associated with NB-IoT, CIoT or other types of IoT are next identified and described in more detail further down.

In a first example technique, a location server (LS) (e.g. E-SMLC 110 or H-SLP 118) may be informed (e.g. by MME 108) that the UE 102 being positioned supports CIoT and/or NB-IoT, or has network access via NB-IoT. This may be accomplished via (i) a parameter, indicating NB-IoT access or CIoT support, in a location request sent from an entity such as MME 108 or external client 150 to the LS and/or (ii) a UE subscription parameter configured in the LS indicating support of CIoT and/or NB-IoT. The LS may then limit positioning interaction with the UE 102 by, e.g., using a reduced maximum positioning message size, a reduced message volume, longer retransmission and/or response timers. The parameter in the location request, for example, may define aspects of NB-IoT access and/or CIoT support for the UE 102 (e.g. a maximum positioning message size, a maximum message volume, a maximum expected message transfer delay).

In a second example technique, an accurate last known location of UE 102 may be provided to an external client 150 when the UE 102 is not available for a current positioning request. To support this, the UE 102 may obtain downlink (DL) measurements, e.g. for Enhanced Cell ID (ECID) and/or Observed Time Difference of Arrival (OTDOA), prior to and/or after entering a network connected state, and provide these measurements to the network, e.g., to a serving Evolved NodeB (eNB) 104 or serving MME 108. The provided measurements together with the last known serving cell identity (ID) for UE 102 may then be stored, e.g., in the serving MME 108, and used to obtain a last known location of the UE 102, if later requested by an external client 150 after the UE 102 is no longer in a network connected state, by modifying a normal location procedure to use only the stored information.

In a third example technique, when the UE 102 enters a network connected state, e.g., has a network signaling link, any pending Mobile Terminated Location Request (MT-LR) for the UE 102, or any Mobile Originated Location Request (MO-LR) instigated by the UE 102, may be started in a conventional manner by the network (e.g. by E-SMLC 110), but the UE 102 defers making any measurements until back in idle state (e.g. with no network connection). While in the idle state with no network connection, the UE 102 performs DL measurements, re-enters the network connected state and sends the measurements back to the network or LS (e.g. E-SMLC 110 or H-SLP 118). This technique may overcome resource limitations in the UE 102 (e.g. regarding available processing, memory and/or an RF receiver chain) that could otherwise impede DL measurements while the UE 102 is in network connected state and using resources to perform other activity. The extra delay in returning measurements by the UE 102 may be much smaller than the delay in waiting for the UE 102 to initially enter the connected state, so the extra delay may not appear significant to an external client 150.

In a fourth example technique, a combined periodic and triggered MT-LR procedure for Long Term Evolution (LTE) and NB-IoT access is used by a network (e.g. VPLMN EPC 130) in which the UE 102 evaluates trigger conditions at a defined minimum interval while in idle state and enters the connected state when a trigger event is detected by the UE 102 in order to enable a location of the UE 102 to be obtained (e.g. by E-SMLC 110) and provided to external client 150.

More details are next provided of the previous techniques and the limitations associated with supporting location for a UE 102 that is using NB-IoT radio access and/or CIoT features to access a wireless network (e.g. VPLMN EPC 130 and E-UTRAN 120) which these techniques may help overcome or mitigate.

PSM and eDRX Limitations

Limitations on location support for UEs (e.g. UE 102) that support NB-IOT radio access or for which CIoT is applicable, may arise due to various features applicable to CIoT and NB-IoT such as extended Discontinuous Reception (eDRX) and Power Saving Mode (PSM). With eDRX or PSM, a UE 102 may remain in idle state and neither be reachable from a serving network nor connect to the serving network (e.g. E-UTRAN 120 and EPC 130) for a long period of time (e.g. several hours or longer). During the period of time in which the UE 102 remains in idle state, it may not be possible for an external client 150 to obtain the current location of the UE 102 (e.g. from VPLMN EPC 130 or HPLMN 140), thereby restricting or blocking location services. This limitation may affect use of the 3GPP control plane (CP) location solution as defined in 3GPP TSs 36.305 and 23.271 and/or may affect use of the SUPL UP location solution defined by OMA or use of other location solutions such as solutions defined by the Institute of Electrical and Electronics Engineers (IEEE) and the Internet Engineering Task Force (IETF). This limitation may also affect and impede proprietary location solutions in which a UE 102 and an external client 150 (e.g. which may be an external location server) communicate to obtain a location for the UE 102 using a proprietary protocol or protocols.

With eDRX, the paging cycle for a UE 102 can be as long as 2.91 hours during which a UE 102 could be unavailable for positioning—e.g. using a Mobile Terminated Location Request (MT-LR) as defined in 3GPP TS 23.271. With PSM, a UE 102 may be available for positioning for the duration of a periodic Tracking Area Update (TAU) timeout which could be several hours or longer. In both cases, a UE 102 could become unpredictably available when a mobile originated (MO) service is invoked by the UE 102 (e.g. such as the Short Message Service (SMS)), which would then provide an opportunity to perform positioning for any deferred MT-LR. This means that an external client 150 who needs the current location of the UE 102 could need to wait for an extended and unpredictable time for the location to become available. If the external client 150 is, or is associated with, a person as opposed to a machine, the ensuing MT-LR location service could be considered as almost useless. For example, a user who wishes to locate a child, asset or pet that has an NB-IoT tracking device will not normally want to wait several hours for a response.

To help overcome the previously described limitations associated with eDRX and PSM, several techniques may be used. In a first technique referred to as "last known location", a VPLMN EPC 130 (e.g. MME 108 or E-SMLC 110) may return (i) a last known location for a UE 102 to an external client 150 when the UE 102 is not available for a current MT-LR location request and (ii) optionally the maximum time period that the UE 102 may continue to remain unavailable due to eDRX or PSM. In a second technique referred to as "deferred location", a VPLMN EPC 130 and/or HPLMN 140 may support a deferred location request for a UE 102 from an external client 150. In a third technique referred to as "periodic and triggered location", a VPLMN EPC 130 and/or HPLMN 140 may support a periodic and triggered location capability for a UE 102. Such a periodic and triggered location capability may allow an external client 150 to temporarily activate positioning for a UE 102 such that location results for the UE 102 are available to the external client 150 without significant delay. These techniques are described in more detail below.

Last Known Location

To overcome or mitigate some disadvantage of a long response time for locating a UE 102 with eDRX or PSM, as described above, an external client 150 might request a last known location for such a UE 102 or the EPC 130 might return a last known location for the UE 102 if the UE 102 will not become available for a current location for some long period. In the case of CIoT, there is a capability to obtain a last known location of a UE 102 as described in 3GPP TS 23.682, but the location granularity of this capability is restricted to a cell ID or Tracking Area (TA) which may mean a location error of 500 to 1000 meters or more. While the location granularity of a cell ID or TA may be useful in some cases, it may be better to enable finer granularity. For example, a person locating a child or pet may like to know whether the last known location was compatible with the child being at school or the pet being at home. In addition, the solution for last known location in 3GPP TS 23.682 is not directly aligned with the 3GPP CP location solution in 3GPP TS 23.271 since the architecture and protocols are different. Accordingly, an operator who offers location services using the 3GPP control plane (CP) solution defined in 3GPP TS 23.271 may need to add new capability to support the solution in 3GPP TS 23.682 which could add additional cost and complexity—e.g. to VPLMN EPC 130 or HPLMN 140. This means that a new capability to obtain a more accurate last known location for a UE 102 by enhancing the 3GPP CP location solution may be useful with power saving features. Two techniques to support a more accurate last known location of a UE 102 are next described.

In a first technique for last known location, the serving MME 108 for UE 102 stores in memory: (i) the last known serving cell ID (e.g. an E-UTRAN Cell Global Identifier (ECGI)) or last serving eNB ID (e.g. for the eNB 104) for the UE 102 after UE 102 goes into idle state (e.g. with no active signaling link from UE 102 to the VPLMN E-UTRAN 120 and no active signaling connection from UE 102 to the VPLMN EPC 130) and (ii) a timestamp indicating when the UE 102 went into idle state. The last known serving cell ID or last serving eNB ID may be used to derive a last known location for the UE 102 should an MT-LR location request for the UE 102 be received later (e.g. by the serving MME 108) from an external client 150 (e.g. via the H-GMLC 148 and V-GMLC 116) when the UE 102 is still in idle state and unavailable for paging. The MME 108 may make use of the E-SMLC 110 to convert the last known cell ID or last serving eNB identity into a geographic location. For example, the Location Services Application Protocol (LCS-AP) location procedure defined in 3GPP TS 29.171 may be used with a new parameter, new flag or new parameter value being included in an LCS-AP Location Request message sent from the MME 108 to the E-SMLC 110 which tells the E-SMLC 110 that the UE 102 is not available for location and that the E-SMLC 110 needs to determine a location for the UE 102 using only the information included by the MME 108 in the LCS-AP Location Request message. The E-SMLC 110 may then determine a last known location for the UE 102 using only the information included by the MME 108 in the LCS-AP Location Request message (e.g. which may include the last known serving cell ID or last serving eNB ID). Since the UE 102 could have changed serving cell with the serving eNB (e.g. eNB 104) remaining the same, the E-SMLC 110 may use only an eNB portion of a last known serving cell ID (e.g. ECGI) to determine a last known location for the UE 102. However, when UE 102 has NB-IoT access, the E-SMLC 110 may use the entire last known serving cell ID (e.g. ECGI) since a change of serving cell may not be supported for NB-IoT access. E-SMLC 110 may then return the last known location to the MME 108 in an LCS-AP Location Response message. The MME 108 may then return the last known location for the UE 102, and a time (and date) (or an age) for the last known location corresponding to the timestamp for when the UE entered idle state, to the external client 150 (e.g. via the V-GMLC 116 and H-GMLC 148).

In a second technique for last known location, the previously described first technique may be extended with some additional location measurements. The UE 102 may provide location measurements to the MME 108 when the UE 102 enters connected state (e.g. obtains a signaling connection to the eNB 104 and MME 108), before returning to idle state, and/or at other times. The serving eNB 104 may similarly obtain location measurements for the UE 102 when a signaling link is established to the UE 102, prior to releasing the signaling link, and/or at other times. The measurements may include measurements applicable to the ECID position method such as RSSI, RSRP, RSRQ and/or RTT and/or other measurements such as OTDOA RSTD measurements. The measurements may be provided to the serving MME 108 by UE 102 and/or by eNB 104. The MME 108 may then store the measurements in memory. The MME 108 may also store a timestamp indicating when the measurements were received or were obtained (e.g. if this time is provided to the MME 108 and is earlier). The MME 108 may then include any stored location measurements (and the last known serving cell ID or last serving eNB ID) in an LCS-AP Location Request sent to E-SMLC 110 to obtain a last known location from E-SMLC 110 as described for the first technique for last known location. In the case of the second technique, the E-SMLC 110 may compute the last known location for UE 102 using both the provided last known serving cell ID or last serving eNB ID and the provided location measurements. While the first technique for last known location may be restricted to cell ID granularity, the second technique may use ECID or OTDOA positioning and may therefore be more accurate.

Deferred Location

When eDRX or PSM is used for a UE 102, a deferred location for the UE 102, obtained automatically by the VPLMN EPC 130 and HPLMN 140 after the UE 102 becomes available (e.g. is connected to VPLMN EPC 130), may be useful to avoid reliance on notifying an external client 150 when the UE 102 next becomes available for positioning and requiring the external client 150 to then issue an MR-LR request before the UE 102 again becomes unavailable. Support of a deferred location for the UE availability event is defined by 3GPP for GSM and UMTS access in 3GPP TS 23.271 and is able to support change of a Serving General Packet Radio Service (GPRS), Support Node (SGSN), or serving Mobile Switching Center (MSC) for a UE 102. For E-UTRAN access, an MT-LR procedure for current location for a UE 102 has been extended in 3GPP TS 23.271 to support deferral of a current UE 102 location until the UE 102 next becomes available, but the procedure does not fully support change of a serving MME for a UE 102 (e.g. change of MME 108 to some other MME not shown in FIG. 1) and assumes an external client 150 will request a current location rather than a deferred location for a UE 102. That means the MT-LR procedure for E-UTRAN access by a UE 102 in 3GPP TS 23.271 is not aligned with deferred location for GSM and UMTS access in which the external client 150, R-GMLC and H-GMLC 148 are all aware of and support the deferred location request. As a consequence, for a UE 102 that uses eDRX and/or PSM with E-UTRAN access, a deferred MT-LR can only be supported with restrictions. This means that an enhancement to the MT-LR procedure for E-UTRAN access by a UE 102 in 3GPP TS 23.271 to provide full alignment with deferred location for the UE availability event for GSM and UMTS access would be useful.

To support this enhancement to the MT-LR procedure, a deferred MT-LR location procedure may be added for the UE availability event in 3GPP TS 23.271 for EPC access by a UE 102 that is aligned with the current 3GPP MT-LR location procedure for the UE availability event for GSM and UMTS access. This may allow an external client 150 to request a deferred location for UE 102 for the UE availability event without having to know in advance which access type the UE 102 is using. In addition, common parts of the deferred MT-LR procedure involving the H-GMLC 148 and an R-GMLC may be shared (e.g. for GSM, UMTS and EPC access) to reduce network impacts (e.g. to the HPLMN 140 and VPLMN EPC 130).

Periodic and Triggered Location

Periodic location for a UE 102 (e.g. location of UE 102 at fixed periodic intervals) and triggered location for a UE 102 (e.g. location of UE 102 whenever UE 102 enters, leaves or remains within a specified geographic area) are defined for GSM and UMTS access by a UE in 3GPP TS 23.271, but are not defined for E-UTRAN access. In the case of a UE 102 supporting CIoT features (e.g. eDRX, PSM and/or CIoT CP optimization), a solution is defined in 3GPP TS 23.682 to support reporting of a change in location for the UE 102, but the solution is not aligned with support of control plane location as defined in 3GPP TS 23.271, since the solution in 3GPP TS 23.682 uses a different architecture and different protocols than the solution in 3GPP TS 23.271. In addition, the solution in TS 23.682 enables determination of a location for the UE 102 with a granularity only of cell ID or TA which could have an error of 500 meters or more and can only report a location when a UE 102 becomes available (e.g. after an interval of 2.91 hours in the case of the longest eDRX paging cycle for the UE 102).

A more flexible periodic and triggered MT-LR capability may be useful to enable location of a UE 102 that has LTE access or NB-IoT access at times other than when the UE 102 normally becomes available (e.g. becomes connected to the VPLMN EPC 130) and/or with finer granularity than a cell ID or TA. For example, a user might like to know when a valuable asset, child or pet enters or leaves a particular area immediately after the event occurs, rather than hours later, and may in addition prefer a more accurate current location when such an event occurs. The lack of support for periodic and triggered location for E-UTRAN access by a UE 102 may thus restrict location support for the UE 102 (e.g. with eDRX or PSM).

Two techniques may be employed to support periodic and triggered location for a UE 102 to overcome the limitations described above. In a first technique for periodic and triggered location, a new periodic MT-LR procedure for EPC access by a UE 102 may be added in 3GPP TS 23.271 aligned with the existing periodic MT-LR procedure for GSM and UMTS access. This may enable an external client 150 to request periodic location for a UE 102 without having to know in advance which access type the UE 102 is using. In addition, portions of the periodic MT-LR procedure involving an R-GMLC and the H-GMLC 148 may be common for all access types (e.g. GSM. UMTS and LTE) to reduce impacts (e.g. to HPLMN 140 and VPLMN EPC 130). Both uplink and downlink positioning of the UE 102 may be applicable.

In a second technique for periodic and triggered location, a new triggered MT-LR procedure for the change of area event for EPC access may be added in 3GPP TS 23.271 aligned with the existing triggered MT-LR procedure for GSM and UMTS access. With the change of area event, an external client 150 can provide (e.g. to an R-GMLC or to the H-GMLC 148) a target geographic area (e.g. defined using a circle, ellipse or polygon) and an indication of whether location reports for the UE 102 are requested by the external client 150 when the UE 102 enters, leaves or remains within the target area. The target area may be converted (e.g. by an R-GMLC, H-GMLC 148 or V-GMLC 116) into a set of cell IDs and/or other areas (e.g. TAs in the case of EPC access) that approximately correspond to (e.g. cover) the target area before being provided to the UE 102. The new triggered MT-LR procedure for EPC access may enable an external client 150 to request triggered location for the UE 102 without having to know in advance which access type (e.g. GSM, UMTS or LTE) the UE 102 is currently using. In addition, portions of the procedure involving an R-GMLC and the H-GMLC 148 may be common to all access types (e.g. GSM, UMTS and LTE) to reduce impacts (e.g. to HPLMN 140 and VPLMN EPC 130). In order to reduce power consumption, the UE 102 may be allowed to evaluate the trigger condition (e.g. whether the UE 102 has entered, left or remained within the target area) while in idle state (e.g. with no signaling connection to the eNB 104 and MME 108) at some defined trigger evaluation interval (e.g. a minimum or a maximum trigger evaluation interval) and only return to connected state when a trigger condition is detected. The UE 102 may determine whether it has entered, left or remained within the target area by detecting a cell ID or cell IDs from nearby eNBs (e.g. eNB 104 and/or eNB 106) and comparing the detected cell ID(s) to the cell IDs provided earlier (e.g. by MME 108) for the target area. For example, if the UE 102 detects a cell ID that belongs to the target area, the UE 102 may assume that UE 102 entered the target area if the UE 102 did not detect any cells belonging to the target area previously. Similarly, if the UE 102 does not detect any cells belonging to the target area, the UE 102 may assume that the UE 102 has left the target area if the UE 102 detected one or more cells belonging to the target area previously. Other trigger conditions may also be provided to the UE 102 (e.g. by MME 108) and evaluated at the trigger evaluation interval such as a trigger condition that occurs when the UE 102 moves by more than some threshold linear distance from a previous location or has attained some minimum velocity. After the UE 102 returns to connected state (e.g. after detecting a target area trigger condition), the current UE 102 location may be obtained (e.g. by the E-SMLC 110) and provided to the external client 150 (e.g. via the V-GMLC 116 and H-GMLC 148) along possibly with the type of trigger condition that has occurred.

In some embodiments, the first and second techniques for supporting periodic and triggered location may be combined using a single procedure that supports both periodic location of the UE 102 and triggered location (e.g. based on UE 102 entering, leaving or remaining within a specified target geographic area).

UE Positioning Protocol Limitation

For position methods such as ECID, OTDOA and A-GNSS, a UE 102 and a location server (e.g. E-SMLC 110 or H-SLP 118) may need to exchange positioning protocol messages in order to: (i) allow the location server to obtain the positioning capabilities of the UE 102, transfer assistance data to the UE 102 and/or send a request for a location or location measurements to the UE 102; and/or (ii) allow the UE 102 to request assistance data from the location server and/or send location measurements or a calculated location to the location server. Positioning protocols that may be used in the case of LTE, eMTC or NB-IoT access by a UE 102 include the LTE Positioning Protocol (LPP) defined in 3GPP TS 36.355, the LPP Extensions (LPPe) protocol defined by OMA in OMA TS OMA-TS-LPPe-V1_0, OMA-TS-LPPe-V1_1 and OMA-TS-LPPe-V2_0, and a combination of LPP with LPPe referred to as LPP/LPPe. However, for a UE 102 with NB-IoT access, transmission delay between a UE 102 and eNB 104 may be much higher than for normal LTE access by the UE 102 due to lower bandwidth and/or a higher signal error rate (e.g. which may lead to a transmission delay of several seconds or more), which may lead to longer message delivery times and the need for longer end-to-end response timers and retransmission timers.

For LPP messages exchanged between the UE 102 and E-SMLC 110 for the 3GPP CP solution, the E-SMLC 110 may support retransmission of undelivered (e.g. unacknowledged) LPP messages as defined in 3GPP TS 36.355. A minimum retransmission timeout defined in 3GPP TS 36.355 is currently 250 milliseconds (ms) though an E-SMLC 110 may use a longer timeout to avoid unnecessary retransmission. In the case of NB-IoT access by a UE 102, the normal E-SMLC retransmission timeout (of 250 ms or more) for E-UTRAN access may be too short leading to excessive retransmission which could place extra load on the signaling connection between the UE 102 and E-SMLC 110 via the serving eNB 104 and serving MME 108.

For SUPL messages exchanged between the UE 102 and H-SLP 118 (or some other SLP) for the OMA SUPL UP location solution, the SUPL messages may be treated as Protocol Data Units (PDUs) by the VPLMN EPC 130 and the HPLMN 140 and may therefore be transported using the CIoT CP optimization referred to previously. In this case, an H-SLP 118 could support end-to-end retransmission of unacknowledged PDUs using the Transmission Control Protocol (TCP) defined by IETF but again the retransmission timeout could be too short leading to unnecessary retransmission of PDUs that might overload the NB-IoT network connection for UE 102.

In addition to the longer delivery time for positioning protocol messages, message size for NB-IoT access for a UE 102 may need to be constrained to some maximum size in order to avoid inefficient Internet Protocol (IP) fragmentation by VPLMN EPC 130 and VPLMN E-UTRAN 120. Furthermore, message volume (e.g. number of PDUs sent every minute or every few minutes) may need to be limited for NB-IoT and CIoT devices due to limited bandwidth (e.g. 180 KHz for NB-IoT access) and/or, in the case of data PDUs (e.g. which could be applicable to SUPL location), due to explicit serving Public Land Mobile Network (PLMN) and Access Point Name (APN) rate control.

The preceding observations show that for a UE 102 with NB-IoT radio access and/or that is using CIoT features (e.g. eDRX, PSM and/or CIoT CP optimization), message delivery time expectation and message retransmission time may need be longer, message size may need to be limited (e.g. to below some maximum value) and/or message volume may need to be limited. However, a location server such as E-SMLC 110 or H-SLP 118 may not normally be aware of these requirements (e.g. when UE 102 has NB-IoT access or eMTC access), and may attempt to use an inappropriately short message delivery time expectation and message retransmission time, inappropriately large message sizes and/or an inappropriately high message volume, which may cause various problem as just described.

To overcome the problems just described, an MME 108 may provide an indication to an E-SMLC 110 in an LCS-AP Location Request message (as defined in 3GPP TS 29.171) of the access type currently being used by a UE 102. For example, the MME 108 may indicate to the E-SMLC 110 that the UE 102 has NB-IoT access when this applies (e.g. or may indicate eMTC access when eMTC access applies). Additional or alternative information (e.g. parameters) could also be provided by MME 108 to E-SMLC 110 in the LCS-AP Location Request message concerning the maximum positioning (e.g. LPP) message size, a maximum message volume and/or an indication of the maximum expected message transfer delay. In the case that E-SMLC 110 is informed by MME 108 that UE 102 has NB-IoT access, the E-SMLC 110 could be configured by the VPLMN EPC 130 network operator with one or more configuration parameters for NB-IoT radio access (or CIoT features), such as a reduced (or preferred) maximum positioning message size, a maximum message volume, and/or a maximum expected message transfer delay which could avoid the need to provide these parameters to the E-SMLC 110 by the MME 108. Assuming that E-SMLC 110 is either configured with NB-IoT access related configuration parameters or provided with such parameters by MME 108 (e.g. in an LCS-AP Location Request message as just described), the E-SMLC 110 may employ longer retransmission and response timers, a reduced maximum positioning message size and/or a limitation on the number (or volume) of positioning protocol (e.g. LPP and/or LPPe) messages transferred between E-SMLC 110 and UE 102. For example, the E-SMLC 110 could limit the amount of assistance data transferred to the UE 102 and/or the number of measurements requested from the UE 102 according to a maximum positioning message size and/or a maximum message number or maximum message volume.

In some implementations, cell configuration data in E-SMLC 110 may inform E-SMLC 110 as to whether a particular serving cell for UE 102 supports NB-IoT access. In these implementations, MME 108 may not need to transfer an explicit NB-IoT indication to E-SMLC 110 for a location request for a UE 102 with NB-IoT access, because E-SMLC may be able to infer NB-IoT access from the serving cell for UE 102 which may have been provided to E-SMLC 110 by MME 108.

UE Positioning in Idle State

UEs (e.g. a UE 102) that support NB-IoT radio access and/or CIoT features, such as CIoT CP optimization, eDRX and/or PSM, may have limited resources such as limited processing capability, limited memory and/or only one radio frequency (RF) receiver chain. This may be a consequence of implementing such UEs as low cost devices that communicate infrequently and with low battery power. The limited resources may limit positioning support, particularly when a UE 102 is performing other activities such as data transfer and/or SMS (text) transfer on behalf of a user for the UE 102 or an application in the UE 102. The resource limitation may directly impact position methods such as OTDOA, ECID, A-GNSS and WiFi, since a UE 102 may need to tune away from a serving eNB 104 to a different frequency or a number of different frequencies in order to measure signals from, and obtain related location measurements for, non-serving eNBs (e.g. eNB 106), GNSS SVs (e.g. SVs 160) and/or WiFi APs associated with these position methods. The UE may also need to store the resulting locations measurements (e.g. measurements of RSSI, RSRP, RSRQ, RSTD, RTT, SV pseudoranges) until transferred to the network (e.g. to E-SMLC 110 or H-SLP 118). Limited resources in a UE 102 may therefore limit the ability of the UE 102 to support some position methods.

As just discussed, UE 102 resources may be limited and possibly unavailable when the UE 102 is in connected state (e.g. with a signaling connection to eNB 104 and MME 108) due to other UE 102 activity such as transferring data and/or SMS messages. However UE 102 resources may be maximally available while the UE 102 is in idle state, since no communication activity and little or no other activity may then be ongoing in UE 102. Hence, the current MT-LR, Network Induced Location Request (NI-LR) and MO-LR location procedures defined in 3GPP TS 23.271 for LTE access by a UE 102, and the corresponding MT-LR and MO-LR location procedures for the OMA SUPL UP location solution, may be amended such that location measurement by the UE 102 are allowed to occur only when the UE 102 is in idle state. The MT-LR, MO-LR and NI-LR procedures may then function as currently defined up until the point when a location request is sent to the UE 102 by the E-SMLC 110 or by the H-SLP 118 (or by some other SLP such as a D-SLP or E-SLP). The UE 102 may then store the location request information (e.g. may store a list of the location measurements being requested) and may acknowledge the location request at the LPP level if an LPP acknowledgment is requested (e.g. by E-SMLC 110) but may not perform any measurements. More than one location request may be sent to and stored by the UE 102 in a similar manner. When the UE 102 next enters idle state, the UE 102 may perform the requested measurements, return to connected state and send the requested measurements (or a location estimate) back to the server (e.g. E-SMLC 110 or H-SLP 118).

Obtaining location measurements while in idle state by UE 102 may require some support from other entities. To enable support from an E-SMLC (e.g. E-SMLC 110) or SLP (e.g. H-SLP 118), a new capability flag or new capability parameter may be added to LPP and/or to LPPe for each position method supported by a UE for which the UE needs to be in idle state to obtain measurements. UE 102 may then send its positioning capabilities to E-SMLC 110 or H-SLP 118 using LPP and/or LPPe and include (or set) the new capability flag or new capability parameter for each position method supported by UE 102 for which UE 102 needs to be in idle state to obtain location measurements. If the capability flag or capability parameter is included (or set) for a particular position method (e.g. A-GNSS, OTDOA, WiFi or ECID) and E-SMLC 110 or H-SLP 118 requests measurements (or a location estimate) from UE 102 for this position method, E-SMLC 110 or H-SLP 118 may indicate a longer than normal maximum response time to UE 102 (e.g. a maximum response time of 2 to 10 minutes) in order to allow enough time for UE 102 to go into idle state, obtain the measurements, re-enter connected state and return the measurements (or a location estimate) back to E-SMLC 110 or H-SLP 118. As an alternative, a new flag or new parameter may be added to LPP or LPPe in a common set of parameters applicable to all position methods to indicate whether UE 102 needs to be in idle state to obtain measurements for any position method supported by UE 102. For this alternative, if the new capability flag or new parameter is included (or set) and E-SMLC 110 or H-SLP 118 requests measurements (or a location estimate) from UE 102 for any position method, E-SMLC 110 or H-SLP 118 may indicate a longer than normal maximum response time to UE 102 to allow enough time for UE 102 to obtain the measurements in idle state as just described.

To enable support from an MME (e.g. MME 108) for UE location measurements in idle state using the 3GPP CP location solution, the serving MME 108 for UE 102 may assume that when UE 102 has NB-IoT access (or possibly another type of narrowband access such as eMTC), the UE 102 may need to make location measurements while in idle state. MME 108 may then allow a CP location session for UE 102 to continue until some threshold time period has expired (e.g. 2 to 5 minutes) after UE 102 next goes into idle state—in order to avoid aborting the CP location session for UE 102 before UE 102 has had time to obtain and return location measurements to E-SMLC 110 via MME 108.

To support location measurements in ide state, UE 102 may explicitly indicate to E-SMLC 110 or H-SLP 118 (e.g. using LPP or LPPe) and/or to MME 108 (e.g. using NAS as defined in 3GPP TS 24.301) that UE 102 needs to enter idle state in order to obtain and return requested location measurements. For example, after E-SMLC 110 or H-SLP 118 sends an LPP Request Location Information message to UE 102 to request location measurements, UE 102 may return an interim LPP Provide Location Information message to E-SMLC 110 or H-SLP 118 (e.g. containing the same LPP transaction ID as the LPP Request Location Information message sent by E-SMLC 110 or H-SLP 118 and with an LPP end of transaction flag not set) indicating that UE 102 needs to enter idle state in order to obtain the requested location measurements. In the case of positioning by E-SMLC 110, E-SMLC 110 may then send a message to MME 108 to indicate to MME 108 that UE 102 needs to enter idle state to obtain requested location measurements.

MME 108 may then assist UE 102 to enter idle state (e.g. by instigating release of a signaling connection from MME 108 to UE 102 or by temporarily suspending data and text transfer to and from UE 102 which may enable eNB 104 or UE 102 to release the signaling connection for UE 102 after detecting a period of signaling inactivity). UE 102 may then enter idle state and obtain the requested location measurements. E-SMLC 110, H-SLP 118 and/or MME 108 may allow for a longer than normal response time from UE 102 (e.g. due to being informed that UE 102 needs to enter idle state to obtain the location measurements) and may thereby avoid aborting the location session to UE 102. After UE 102 obtains the requested location measurements, UE 102 may re-enter connected state and send the location measurements to E-SMLC 110 or H-SLP 118.

In case the entry to idle state by UE 102 is delayed for a long time (e.g. 3 minutes or more) on the network (VPLMN) side, the UE 102 may run a timer and locally release the RRC signaling connection to the eNB 104 and enter idle state after some period of inactivity in the UE 102. Alternatively, the UE 102 may request release or suspension of the RRC signaling connection from the serving eNB 104 by sending an RRC message to the serving eNB 104 containing this request, which may then allow the UE 102 to enter idle state. In the case of a high priority location request, an E-SMLC 110 may indicate to the MME 108 when the UE 102 can be allowed to go into idle state. For the 3GPP CP location solution, such a procedure could require that the MME 108 and E-SMLC 110 are aware of the UE 102 going into idle state to perform the measurements in order to retain location context and location session information while the UE 102 is in idle state and employ suitably long response timers. This awareness by the MME 108 and E-SMLC 110 could be associated with NB-IoT access for the UE 102 if the use of idle state to obtain location measurements by UE 102 is used only when UE 102 has NB-IoT access. Alternatively, the use of idle state to obtain location measurements by the UE 102 may be treated as a new CIoT UE capability (e.g. and may be indicated to the MME 108 by the UE 102 using NAS signaling when attaching to the VPLMN EPC 130 and/or may be indicated to the E-SMLC 110 or H-SLP 118 using LPP or LPPe). The use of idle state for UE 102 measurements may have the effect of delaying a location response to an external client 150. However, such a delay may be very small in comparison to the longer delay involved in waiting for a UE 102 to become available for location and may therefore not be significant to the external client 150.

Security for NB-IoT

For a UE 102 with NB-IoT access that supports CIoT CP optimization but not UP data transfer, Access Stratum (AS) security (in which wireless signaling between a UE 102 and eNB 104 may be encrypted) may not be supported for the UE 102. For a UE 102 that supports CIoT CP optimization and normal UP data transfer or CIoT User Plane (UP) optimization (in which a signaling connection for a UE 102 can be suspended rather than released), AS security could be supported as soon as a Packet Data Network (PDN) connection for the UE 102 is created or resumed.

In the case of location for a UE 102 using the 3GPP CP solution defined in 3GPP TS 36.305, the possible lack of AS security may not be important when positioning of the UE 102 is supported using the LPP and/or LPPe positioning protocols. This is because LPP and/or LPPe messages may be transferred between the UE 102 and serving MME 108 inside Non-Access Stratum (NAS) messages, such as Uplink and Downlink generic NAS transport messages defined in 3GPP TS 24.301. All NAS messages may be protected via encryption, while in transit between the UE 102 and serving MME 108, using NAS security and may thereby not be a security risk for the UE 102 or VPLMN EPC 130.

Similar protection may apply to the OMA SUPL solution. In this case, SUPL messages may be transferred as data between the UE 102 and an SLP such as H-SLP 118 using either (a) CIoT CP optimization or (b) EPC UP data bearers associated with CIoT UP optimization or non-optimized UP bearers. NAS security may be available for (a) and AS security may be available for (b) in which SUPL messages transferred to and from a UE 102 would be encrypted at least while in transit between the UE 102 and serving eNB 104.

When the 3GPP CP solution defined in 3GPP TS 36.305 is used with uplink position methods in which measurements of a UE 102 are received by an E-SMLC 110 not directly from the UE 102 but from the serving eNB 104, other eNBs such as eNB 106 (e.g. using the LTE Positioning Protocol A (LPPa), defined in 3GPP TS 36.455) or from Location Measurement Units (LMUs), security may be an issue. Examples of uplink position methods defined in 3GPP TS 36.305 include Uplink Time Difference of Arrival (U-TDOA) and ECID where location measurements for UE 102 are obtained by a serving eNB 104 for UE 102, other eNBs (e.g. eNB 106) and/or by LMUs rather than by the UE 102. In these cases, any Radio Resource Control (RRC) signaling used between the serving eNB 104 and UE 102 to coordinate positioning, and/or receive measurements obtained by the UE 102 at the serving eNB 104, may not be security protected (e.g. may not be encrypted) when CIoT CP optimization is use for data PDU transfer between the MME 108 and UE 102. In addition, any uplink transmission from a UE 102 at the RRC level that is measured by the serving eNB 104, another eNB 106 and/or by an LMU may not be security protected (e.g. may not be encrypted) and could thus be easier for other entities to intercept and measure. These limitations mean that support of uplink positioning for a UE 102 (e.g. using the LPPa and RRC protocols) may not be secure in the case of CIoT CP optimization when no UP data bearers are supported by or established to the UE 102.

In order to mitigate lack of security in the case of uplink positioning of a UE 102, an MME 108 may indicate to an E-SMLC 110, in an LCS-AP Location Request sent to the E-SMLC 110, whether or not AS security (e.g. encryption) is currently being used for a UE 102. For example, for a UE 102 that uses CIoT CP optimization for all data transfer, the MME 108 could indicate that AS security is not being used. The E-SMLC 110 could then take this into account when instigating different position methods for the UE 102. For example, downlink position methods that are supported by UE 102 (such as A-GNSS and OTDOA) might be used by the E-SMLC 110 as security may not be needed due to the availability of NAS security and encryption as previously described. However, for uplink positioning, the E-SMLC 110 may only invoke uplink position methods that are dependent on eNB measurements (e.g. from eNB 104) that do not require additional RRC signaling with the UE 102 when AS security is not being used.

CP Versus UP Location Solutions with NB-IoT

With the 3GPP CP location solution (e.g. as defined in 3GPP TS 23.271 and 36.305), an MME 108 may queue a deferred MT-LR request for a UE 102 until UE 102 is next reachable for positioning and may avoid sending a deferred request to E-SMLC 110, which may simplify implementation of E-SMLC 110. A last known location for the UE 102 may also be supported by storing the last known serving cell ID (and possibly location measurements) for the UE 102 in the MME 108 or eNB 104 as previously described. The E-SMLC 110 may also receive the current cell ID and possibly ECID location measurements for a current location request for a UE 102 when the UE 102 is reachable for positioning. The MME 108 may remain aware that a CP location session is active and allow the UE 102 to remain in connected state longer or come back from idle state to return requested measurements to the E-SMLC 110 as previously described.

With the OMA SUPL UP location solution, an H-SLP 118 may receive a location request from an external client 150 while the UE 102 is in idle state and not available for paging (e.g. by the MME 108) and may have to wait, e.g., several hours, to obtain a location for the UE 102. The H-SLP 118 also cannot necessarily obtain a last known location for the UE 102 using current SUPL procedures. The H-SLP 118 may also not know when the UE 102 will next become available for positioning. For example, the H-SLP 118 may send a SUPL INIT message to the UE 102 to start a SUPL location session and then wait several hours for a reply from the UE 102.

To improve SUPL location, the H-SLP 118 may use or support a Services Capability Server (SCS) function to obtain a last known cell ID and/or a UE 102 availability (or reachability) indication from a Service Capability Exposure Function (SCEF) in the HPLMN 140 for the UE 102 as defined in 3GPP TS 23.682. This could allow an H-SLP 118 to support last known location, current location and deferred periodic and triggered location for the UE 102 in a manner almost comparable with the 3GPP CP location service.

Some more detailed exemplary embodiments are provided herein for some of the techniques described previously.

Figure 2:
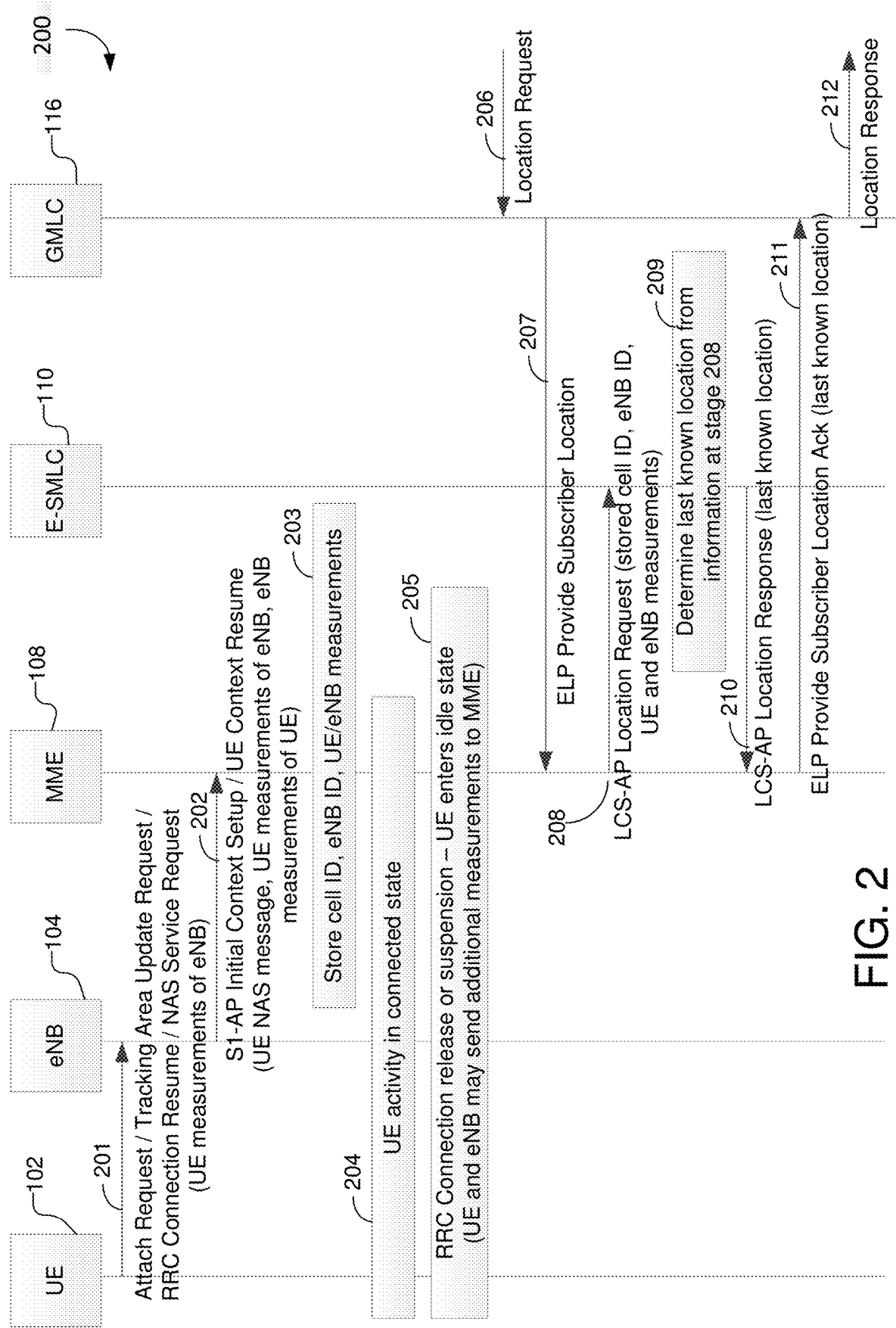
FIG. 2 is a signaling flow diagram illustrating how, according to an embodiment, a last known location may be obtained for an NB-IoT or CIoT device

FIG. 2 shows a signaling flow 200 illustrating a process of obtaining a last known location for a UE 102 that is using NB-IoT radio access and/or features applicable to IoT or CIoT. As illustrated at stage 201, the UE 102 transmits a request that is received by the eNB 104. The request enables the UE 102 to enter connected state in which the UE 102 obtains an active RRC signaling connection to the eNB 104 and MME 108. The request, for example, may be a NAS Attach Request, a NAS Tracking Area Update Request, an RRC Connection Resume, a NAS Service Request or a NAS Control Plane Service Request. The request may include location measurements obtained by UE 102 of signals received from the serving eNB 104 such as measurements of RSSI, RSRP, RSRQ and/or RTT and/or may include RSTD location measurements of eNB 104 and other eNBs (e.g. eNB 106). The location measurements, when obtained by the UE 102, may have been obtained prior to stage 201—e.g. which may assist the location measurements by UE 102 when UE 102 has limited resources due to UE 102 still being in idle state. The request may further include the time (and date) at which the UE obtained the location measurements.

At stage 202, the eNB 104 transmits to the serving MME 108 an S1-AP Initial Context Setup message or an S1-AP UE Context Resume message, which may include any NAS message, UE 102 location measurements and/or time (and date) of location measurements received from the UE 102 at stage 201. Additionally, the message at stage 202 may include the serving cell ID for the UE 102, the eNB 104 ID, location measurements obtained by eNB 104 of the UE 102 (e.g. RSSI, RSRP, RSRQ and/or RTT) and/or a time (and date) at which the eNB 104 obtained the serving cell ID and/or location measurements.

At stage 203, the MME 108 may store the received cell ID, eNB 104 ID, the UE 102 location measurements, the eNB 104 location measurements (or whichever of these were received at stage 202), and the time (and date) at which these were received by MME 108 (or at which these were obtained by UE 102 or eNB 104 if this time was earlier). Following stage 203, the UE 102 may be assigned an RRC signaling link by eNB 104 and a signaling connection to MME 108 and may enter a connected state (not shown in FIG. 2).

At stage 204, UE 102 activity is performed while the UE is in the connected state—e.g. the UE 102 may send and receive data and/or SMS (Short Message Services) messages via one or more of the eNB 104, the SGW 112, the PDG 114 and the MME 108.

At stage 205, the RRC connection (and signaling link) for the UE 102 is released or suspended and the UE 102 enters an idle state. The UE 102 and/or eNB 104 may send additional location measurements to the MME 108 prior to releasing the signaling link (or just after releasing the signaling link in the case of eNB 104) and the MME 108 may store these measurements. The MME may also store the time (and date) at which the UE enters idle state and/or the time (and date) at which the additional location measurements were received or were obtained. The additional location measurements may have been obtained by the UE 102 and/or by the eNB 104 prior to (e.g. immediately prior to) releasing the signaling link. Entry to idle state at stage 205 may be associated with eDRX or PSM support for UE 102 in which UE 102 may not become reachable again by MME 108 (or by VPLMN EPC 130) for a long duration (e.g. several hours).

At stage 206, a location request for the UE 102 is received by the GMLC 116 from some external source (e.g. from an external client 150 either directly or via the H-GMLC 148). The location request is received while the UE 102 is in the idle state. The location request may indicate that a current or last known location is being requested.

At stage 207, the GMLC 116 sends an EPC LCS Protocol (ELP) Provide Subscriber Location message to the serving MME 108 for UE 102 to request a current or last known location for the UE 102 and includes an identity for the UE 102 (e.g. a Mobile Station International Subscriber Directory Number (MSISDN) or International Mobile Subscriber Identity (IMSI)). The GMLC 116 may determine the address or identity of MME 108 (not shown in FIG. 2) by querying an HSS for the UE 102 (e.g. HSS 145) or by being provided with the address or identity of MME 108 in the request at stage 206.

At stage 208, the MME 108 sends an LCS-AP Location Request message to the E-SMLC 110, which may include the serving cell ID, eNB 104 ID, the UE 102 location measurements and the eNB 104 location measurements (or whichever of these are available) that were previously stored at stage 203 and/or stage 205. The MME 108 may include an indication in the LCS-AP Location Request that a location is to be obtained for UE 102 using only the information provided at stage 208 and that the UE 102 is not available for positioning. The indication in the LCS-AP Location Request may also or instead indicate that the UE 102 is not wirelessly connected to the VPLMN EPC 130 and E-UTRAN 120 and/or that a last known location is requested for UE 102. The actions of MME 108 at stage 208 may be based on knowledge by MME 108 that UE 102 is not currently reachable for positioning (e.g. based on support of eDRX or PSM for UE 102 by VPLMN EPC 130). The actions of MME 108 at stage 208 may also be based in part on a request for a current or last known location for the UE 102 received at stage 207.

At stage 209, the E-SMLC 110 may determine a last known location of the UE 102 from the information received at stage 208—e.g. using ECID, cell ID and/or OTDOA position methods. Determination of a last known location for UE 102 by E-SMLC 110 (e.g. instead of attempting to obtain a current location for UE 102) may be based on the indication received at stage 208 that the UE 102 is not available for positioning (or on an indication received at stage 208 that UE 102 is not wirelessly connected to the VPLMN EPC 130 and E-UTRAN 120 or on an indication that a last known location for UE 102 is requested).

At stage 210, the E-SMLC 110 sends to the MME 108 an LCS AP Location Response message, which includes the last known location of the UE 102 obtained at stage 209.

At stage 211, the MME 108 transmits an ELP Provide Subscriber Location Acknowledge message to the GMLC 116 that includes the last known location of the UE 102 received at stage 210 and the time (and date) for the last known location. The time (and date) for the last known location may be the time (and date) when the UE 102 enters idle state, as stored by the MME 108 at stage 205, when the last known location is obtained using a last known cell ID or last known eNB ID for the UE 102. Alternatively, the time (and date) for the last known location may be the time (and date) at which location measurements provided to the E-SMLC 110 at stage 208 to obtain the last known location were received by the MME 108 at stage 202 or stage 205 or were obtained by the UE 102 or eNB 104 if this was earlier. In some embodiments, the time (and date) for the last known location may be replaced by the age of the last known location—e.g. the interval of time between the time (and date) for the last known location and a current time (and date).

At stage 212, the GMLC 116 sends a Location Response message to the external source (e.g. external client 150 or H-GMLC 148) which may include the last known location of the UE 102 and the time (and date), or the age, for the last known location received at stage 211.

Figure 3:
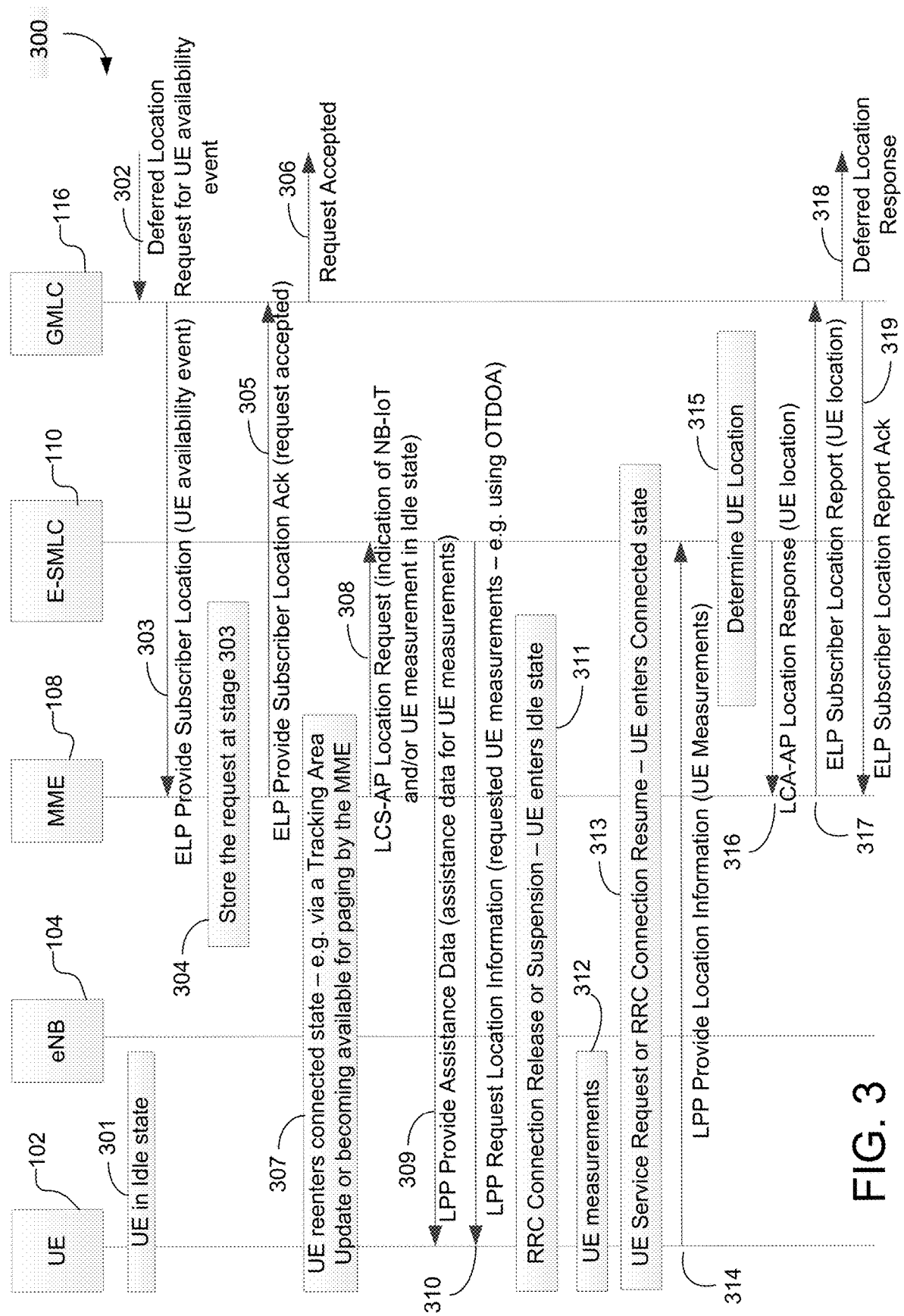
FIG. 3 is a signaling flow diagram illustrating how, according to an embodiment, a deferred location may be obtained for an NB-IoT or CIoT device in which the device may obtain location measurements in an idle state and may need a limitation on positioning interaction with a location server.

FIG. 3 shows a signaling flow 300 illustrating a combined example of deferred location for the UE availability event, an indication to an E-SMLC that a UE has NB-IoT access and needs special positioning support (e.g. a maximum LPP message size, longer retransmission and response timers), and use of the idle state by a UE to obtain location measurements. Although the example is for NB-IoT access and includes (i) a deferred location for UE 102, (ii) UE 102 measurements in idle state and (iii) an indication to an E-SMLC 110 of a UE 102 with NB-IoT access, it is not necessary that all three of these features be used together or that UE 102 have NB-IoT access and other examples may exist where only one or two of these three features are used to locate the UE 102 or where UE 102 has a different access type (e.g. eMTC access). As illustrated, at stage 301 of signaling flow 300, the UE 102 is initially in an idle state with no active RRC signaling connection to a PLMN (e.g. to the eNB 104 and MME 108) and is not currently reachable for positioning—e.g. due to support of eDRX or PSM for UE 102 by VPLMN EPC 130.

At stage 302, the GMLC 116 receives a Deferred Location Request for UE 102 for the UE availability event from some external source (e.g. from an external client 150 either directly or via an H-GMLC 148). The Deferred Location Request may indicate a request for a current location of UE 102 after UE 102 next becomes available (or reachable) for positioning.

At stage 303, the GMLC 116 sends an ELP Provide Subscriber Location message to the MME 108 to request a deferred location of the UE 102 for the UE availability event and includes an identity for the UE 102 (e.g. an MSISDN or IMSI). The GMLC 116 may determine the address or identity of MME 108 (not shown in FIG. 3) by querying an HSS for the UE 102 (e.g. HSS 145) or by being provided with the address or identity of MME 108 in the request at stage 302.

At stage 304, the MME 108 stores the request received at stage 303 as the UE 102 is not currently available for positioning.

At stage 305, the MME 108 returns an ELP Provide Subscriber Location Acknowledge message to the GMLC 116 that confirms that the request at stage 303 is accepted. In some embodiments, the ELP Provide Subscriber Location Acknowledge message at stage 305 may include a last known location for the UE 102 and a time (and date), or an age, for the last known location (e.g. obtained as described for FIG. 2) and/or may include an expected (e.g. maximum) delay for UE 102 to next become available for positioning. For example, the expected (or maximum) delay may equal the time interval until the next allowed paging occasion for UE 102 at MME 108 (e.g. if eDRX is used by UE 102) or the next expected periodic Tracking Area update from UE 102 (e.g. if PSM is used by UE 102).

At stage 306, the GMLC 116 may send a Request Accepted message to the external source (e.g. external client 150) indicating that the request at stage 302 was accepted and may include a last known location for the UE 102, a time (and date), or an age, for the last known location, and/or an expected (or maximum) delay in UE 102 next becoming available for positioning if one or more of these were included at stage 305.

At stage 307 which may occur at some later time (e.g. up to several hours or more after stages 302-306), the UE 102 re-enters a connected state in which UE 102 has an active RRC signaling connection to the eNB 104 and MME 108, e.g., as a consequence of a Tracking Area Update by UE 102 or being paged by MME 108 after becoming available for paging (not shown in FIG. 3).

At stage 308, the MME 108 sends to the E-SMLC 110 an LCS-AP Location Request message for the deferred location request received at stage 303 and may include the current serving cell ID for the UE 102, an indication that the UE 102 has NB-IoT access and/or an indication that the UE 102 performs location measurements while the UE 102 is in idle state. The MME 108 may determine that the UE 102 performs location measurements while in idle state from a CIoT feature indication (e.g. indicating UE 102 location measurements in idle state) provided by UE 102 to MME 108 when UE 102 previously attached to VPLMN EPC 130 (not shown in FIG. 3) or due to the UE 102 having NB-IoT access. Following stage 308, the E-SMLC 110 may request and obtain the positioning capabilities of UE 102 using LPP and/or LPPe (not shown in FIG. 3). For example, E-SMLC 110 may send an LPP Request Capabilities message to UE 102 (via MME 108 and eNB 104 and not shown in FIG. 3) to request the positioning capabilities of UE 102, and UE 102 may return an LPP Provide Capabilities message to E-SMLC 110 (via eNB 104 and MME 108 and not shown in FIG. 3) containing the positioning capabilities of UE 102. In one embodiment, the positioning capabilities of UE 102 may indicate one or more position methods supported by UE 102 for which UE 102 needs to be in idle state in order to obtain location measurements.

At stage 309, the E-SMLC 110 may transmit an LPP Provide Assistance Data message to the UE 102 via the MME 108 and eNB 104 that includes assistance data for UE measurements (e.g. assistance data indicated as supported by any positioning capabilities for UE 102 obtained by E-SMLC 110 after stage 308). The assistance data may be for ECID, OTDOA, A-GNSS and/or other position methods supported by UE 102. In some embodiments, UE 102 may send an LPP Request Assistance Data message to E-SMLC 110 (not shown in FIG. 3) prior to stage 309 and after stage 308 to request the assistance data sent at stage 309. In some embodiments, when E-SMLC 110 is aware that UE 102 has NB-IoT access (e.g. due to an indication of this received at stage 308), E-SMLC 110 may restrict the amount of assistance data sent to UE 102 at stage 309 based on a maximum positioning message size or maximum message volume for a UE with NB-IoT access. For example, the LPP Provide Assistance Data message sent at stage 309 may not exceed a maximum positioning message size (or a maximum message size for any application) for NB-IoT access. In some embodiments, more than one LPP Provide Assistance Data message may be sent to UE 102 at stage 309 in order to send more assistance data to UE 102 without exceeding a maximum positioning message size (or a maximum message size for any application) for NB-IoT access.

At stage 310, the E-SMLC 110 transmits an LPP Request Location Information message to the UE 102 via the MME 108 and eNB 104 that includes a request for location measurements, e.g., for OTDOA, A-GNSS and/or ECID. The LPP Request Location Information message sent at stage 310 may indicate a higher than normal response time (e.g. 2 to 10 minutes) if E-SMLC 110 is aware (e.g. from information provided by MME 108 at stage 308 or from positioning capabilities for UE 102 received following stage 308) that UE 102 needs to be in idle state in order to obtain some or all of the requested location measurements. In some embodiments, when E-SMLC 110 is aware that UE 102 has NB-IoT access (e.g. due to an indication of this received at stage 308), E-SMLC 110 may restrict the number of location measurements requested from UE 102 at stage 310 (e.g. based on a maximum positioning message size for a UE with NB-IoT access). In an embodiment, following stage 310 and not shown in FIG. 3, UE 102 may send an LPP message (e.g. an LPP Provide Location Information message) to E-SMLC 110 and/or a NAS message to MME 108 to indicate that UE 102 needs to enter idle state in order to obtain the location measurements requested by E-SMLC 110 at stage 310.

At stage 311, the RRC signaling connection for UE 102 is released or suspended and the UE 102 enters an idle state. Stage 311 may occur by normal means after data transfer, SMS transfer and/or other activity for UE 102 has finished or been suspended. Alternatively, UE 102 may enter idle state after some period of inactivity without waiting for RRC signaling connection release or suspension from eNB 104 and MME 108. Alternatively, eNB 104 and/or MME 108 may release or suspend the RRC signaling connection before all normal data transfer, SMS and/or other activity for the UE 102 are complete—e.g. due to receiving a request from E-SMLC 110 or from UE 102 to allow UE 102 to enter idle state. Following stage 311, the MME 108 and E-SMLC 110 may retain location session and location context information for the UE 102, based on an indication or awareness (e.g. obtained as described previously) that the UE 102 performs location measurements while in idle state, to enable the location session to resume later at stage 313.

At stage 312, the UE 102 obtains some or all of the location measurements requested at stage 310, e.g., using OTDOA, A-GNSS and/or ECID, while the UE 102 is in the idle state.

At stage 313, the UE 102 transmits a NAS Service Request, an RRC Connection Resume, a CP Service Request or some other message to eNB 104 (or possibly to a different eNB, such as eNB 106, if eNB 104 is no longer suitable as a serving eNB) to enable UE 102 to obtain an RRC signaling connection to eNB 104 (or to another eNB) and to MME 108 and to re-enter a connected state.

At stage 314, and after the UE has re-entered connected state, the UE 102 transmits an LPP Provide Location Information message to the E-SMLC 110 via the eNB 104 (or other serving eNB) and MME 108 that includes the UE location measurements obtained at stage 312.

At stage 315, the E-SMLC 110 determines (e.g. calculates) the UE 102 location using the measurements received at stage 314.

At stage 316, the E-SMLC 110 transmits to the MME 108 an LCS AP Location Response message, which includes the UE location determined at stage 315.

At stage 317, the MME 108 transmits an ELP Subscriber Location Report message to the GMLC 116 that includes the UE 102 location received at stage 316 and other information (e.g. a UE 102 ID such as an MSISDN or IMSI or some other ID received at stage 303 or sent at stage 305) to enable GMLC 116 to associate the ELP Subscriber Location Report message with the ELP message sent by GMLC 116 at stage 303 and the ELP message received by GMLC 116 at stage 305.

At stage 318, the GMLC 116 transmits a Deferred Location Response with the UE 102 location received at stage 317 to the external source (e.g. external client 150).

At stage 319, the GMLC 116 transmits to the MME 108 an ELP Subscriber Location Report Acknowledge message.

Figure 4:
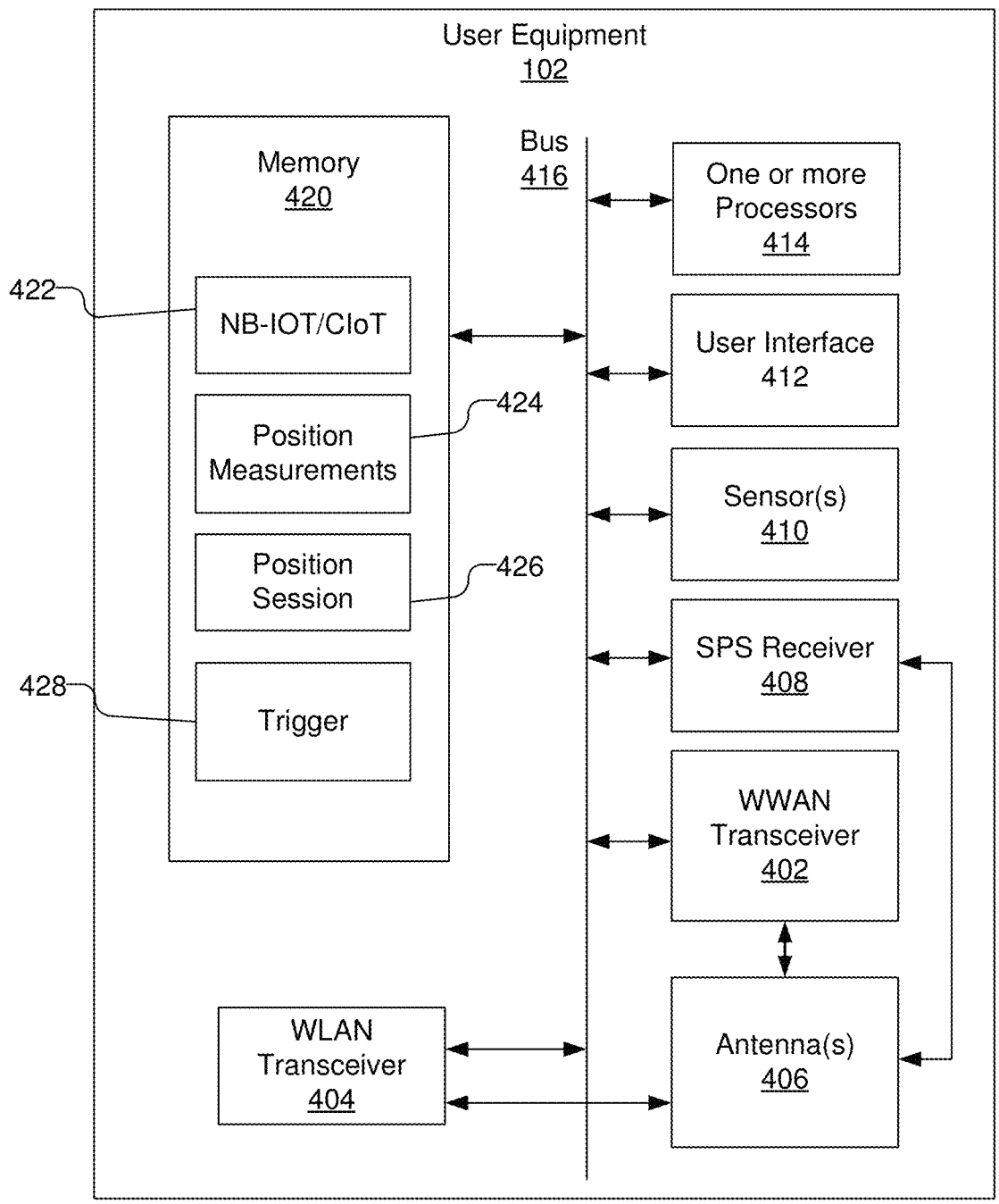
FIG. 4 is a block diagram of an embodiment of a mobile device or UE that may support NB-IoT or CIoT.

FIG. 4 is a diagram illustrating an example of a hardware implementation of UE 102. The UE 102 may include a WWAN transceiver 402 to wirelessly communicate with, e.g., cellular transceivers such as eNB 104 and eNB 106 (shown in FIG. 1). The UE 102 may also include a WLAN transceiver 404 to wirelessly communicate with local transceivers (e.g. WiFi APs or BT beacons). The UE 102 may include one or more antennas 406 that may be used with the WWAN transceiver 402 and WLAN transceiver 404. The UE 102 may further include an SPS receiver 408 for receiving and measuring signals from SPS SVs 160 (shown in FIG. 1), received via antenna(s) 406. The UE 102 may include one or more sensors 410, such as cameras, accelerometers, gyroscopes, electronic compass, magnetometer, barometer, etc. The UE 102 may further include a user interface 412 that may include e.g., a display, a keypad or other input device, such as virtual keypad on the display, through which a user may interface with the UE 102.

The UE 102 further includes one or more processors 414 and memory 420, which may be coupled together with bus 416. The one or more processors 414 and other components of the UE 102 may similarly be coupled together with bus 416, a separate bus, or may be directly connected together or coupled using a combination of the foregoing. The memory 420 may contain executable code or software instructions that when executed by the one or more processors 414 cause the one or more processors 414 to operate as a special purpose computer programmed to perform the techniques disclosed herein. As illustrated in FIG. 4, the memory 420 may include one or more components or modules that may be implemented by the one or more processors 414 to perform the methodologies described herein. While the components or modules are illustrated as software in memory 420 that is executable by the one or more processors 414, it should be understood that the components or modules may be dedicated hardware either in the one or more processors 414 or off the processors.

The memory 420 may include an NB-IoT/CIoT unit 422 that when implemented by the one or more processors 414 configures the one or more processors 414 to enable NB-IoT or CIoT type network communications and features by WWAN transceiver 402 during communication with a network entity (e.g., E-SMLC 110, H-SLP 118, MME 108 or eNB 104), For example, NB-IoT/CIoT unit 422 may cause WWAN transceiver 402 to notify the network entity that the UE 102 supports NB-IoT or CIoT type network communications and/or that the UE 102 supports other features (e.g. such as obtaining location measurements when in idle state) that are associated with NB-IoT or CIoT network communication. When implemented by the one or more processors 414, the NB-IoT/CIoT unit 422 may cause the indication to define aspects of NB-IoT or CIoT radio access type supported by the UE 102.

The memory 420 may further include a location measurements unit 424 that when implemented by the one or more processors 414 configures the one or more processors 414 to obtain location measurements, e.g., using one or more of the WWAN transceiver 402, WLAN transceiver 404 and SPS Receiver 408. For example, the location measurements may include at least one of a cell ID, RSSI, RSRP, RSRQ, RSTD or RTT measurement. When implemented by the one or more processors 414, the location measurements unit 424 may cause the location measurements to be obtained, e.g., prior to connecting to a network, and may cause the WWAN transceiver 402 to transmit the location measurements to a location server (e.g. E-SMLC 110) or other entity (e.g. MME 108) once the UE 102 is connected to a network.

The memory 420 may further include a position session unit 426 that when implemented by the one or more processors 414 configures the one or more processors 414 to engage in, or re-engage in, a positioning session with a location server (e.g. E-SMLC 110 or H-SLP 118), e.g., upon request from the location server or initiated by the UE 102, once the UE 102 enters a connected state with a wireless network (e.g. VPLMN EPC 130 and E-UTRAN 120). When implemented, the position session unit 426 may cause the one or more processors 414 to defer performing location measurements using the location measurements unit 424 until the UE 102 is no longer in a connected state. The position session unit 426, for example, may cause the one or more processors 414 to wait for a release or suspension from the wireless network of a connection to the wireless network or may release the connection to the wireless network. Once the location measurements are obtained using the location measurements unit 424, the one or more processors 414 implementing the position session unit 426 may cause the UE 102 to re-enter a connected state with the wireless network and cause the WWAN transceiver 402 to provide the obtained location measurements to the location server.

The memory 420 may further include a trigger unit 428. The trigger unit 428 when implemented by the one or more processors 414 configures the one or more processors 414 to receive trigger parameters, e.g., provided in a mobile terminated location request. The trigger parameters may include, e.g., a trigger evaluation interval, a periodic maximum reporting interval trigger, and one or more location triggers. The trigger evaluation interval may be a minimum or maximum interval for evaluating the one or more location triggers. The location triggers may comprise at least one of: (i) a fixed periodic reporting interval; (ii) a change of cell; (iii) a change of TA; (iv) an entry into, an exit from or a remaining within a geographic area defined according to a group of cells and/or TAs; or (v) a movement by more than a threshold linear distance from a previous location. The trigger unit 428, when implemented by the one or more processors 414, evaluates the one or more location triggers at the trigger evaluation interval and also tracks the periodic maximum reporting interval trigger. The one or more processors 414 implementing the trigger unit 428 causes the UE 102 to re-enter a connected state with a wireless network when a trigger condition occurs or when the periodic maximum reporting interval trigger occurs and causes the position session unit 426 to initiate or re-initiate a location session with the wireless network (e.g. with an E-SMLC 110 or H-SLP 118 in or accessible from the wireless network).

The methodologies described herein may be implemented by various means depending upon the application. For example, these methodologies may be implemented in hardware, firmware, software, or any combination thereof. For a hardware implementation, the one or more processors 414 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 102 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 420) and executed by one or more processors 414, causing the one or more processors 414 to operate as a special purpose computer programmed to perform the techniques disclosed herein. Memory may be implemented within the one or processors 414 or external to the one or more processors 414. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 102 may be stored as one or more instructions or code on a non-transitory computer-readable storage medium such as memory 420. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 102 may be provided as signals on transmission media included in a communication apparatus. For example, a communication apparatus comprising part or all of UE 102 may include a transceiver having signals indicative of instructions and data. The instructions and data are stored on non-transitory computer readable media, e.g., memory 420, and are configured to cause the one or more processors 414 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 102, that is using Narrowband Internet of Things (NB-IoT) radio access and/or Cellular Internet of Things (CIoT) features, may include a means for entering a connected state with a wireless network by a user equipment that is using Narrowband Internet of Things (NB-IoT) radio access and/or Cellular Internet of Things (CIoT) features, which may be, e.g., the WWAN transceiver 402. A means for engaging in a positioning session with a location server (e.g. E-SMLC 110 or H-SLP 118) may be, e.g., one or more processors 414 with dedicated hardware or implementing executable code or software instructions in memory 420 such as the position session unit 426. A means for receiving a request for location measurements from the location server may be, e.g., the WWAN transceiver 402. A means for deferring performing location measurements until the user equipment is not in the connected state with the wireless network may be, e.g., one or more processors 414 with dedicated hardware or implementing executable code or software instructions in memory 420 such as the position session unit 426. A means for entering an idle state by the user equipment wherein the user equipment is not connected with the wireless network may be, e.g., the WWAN transceiver 402 and one or more processors 414 with dedicated hardware or implementing executable code or software instructions in memory 420. A means for obtaining the location measurements while in the idle state may be, e.g., the WWAN transceiver 402 and one or more processors 414 with dedicated hardware or implementing executable code or software instructions in memory 420 such as the location measurements unit 424. A means for re-entering the connected state with the wireless network may be, e.g., the WWAN transceiver 402 and one or more processors 414 with dedicated hardware or implementing executable code or software instructions in memory 420 such as the position session unit 426. A means for providing the location measurements to the location server may be, e.g., the WWAN transceiver 402 and one or more processors 414 with dedicated hardware or implementing executable code or software instructions in memory 420 such as the position session unit 426.

A user equipment, such as UE 102, that is using Narrowband Internet of Things (NB-IoT) radio access and/or Cellular Internet of Things (CIoT) features, may include a means for receiving a mobile terminated location request from a wireless network (e.g. from an MME 108, E-SMLC 110 or H-SLP 118 in or associated with the wireless network) while the UE is in a connected state with the wireless network, the mobile terminated location request comprising a trigger evaluation interval, a periodic maximum reporting interval trigger, and one or more location triggers, which may be, e.g., the WWAN transceiver 402 and one or more processors 414 with dedicated hardware or implementing executable code or software instructions in memory 420 such as the position session unit 426 and trigger unit 428. A means for evaluating the one or more location triggers at the trigger evaluation interval while the UE is not in the connected state may include, e.g., the one or more processors 414 with dedicated hardware or implementing executable code or software instructions in memory 420 such as the trigger unit 428, as well as one or more of the WWAN transceiver 402, WLAN transceiver 404, SPS receiver 408 and sensors 410. A means for re-entering the connected state with the wireless network when a trigger condition is detected or when the periodic maximum reporting interval trigger occurs may be, e.g., the WWAN transceiver 402, and one or more processors 414 with dedicated hardware or implementing executable code or software instructions in memory 420 such as the trigger unit 428. A means for initiating or re-initiating a location session with the wireless network (e.g. with a location server such as E-SMLC 110 or H-SLP 118 in or accessible from the wireless network) after re-entering the connected state may be, e.g., the one or more processors 414 with dedicated hardware or implementing executable code or software instructions in memory 420 such as the position session unit 426.

Figure 5:
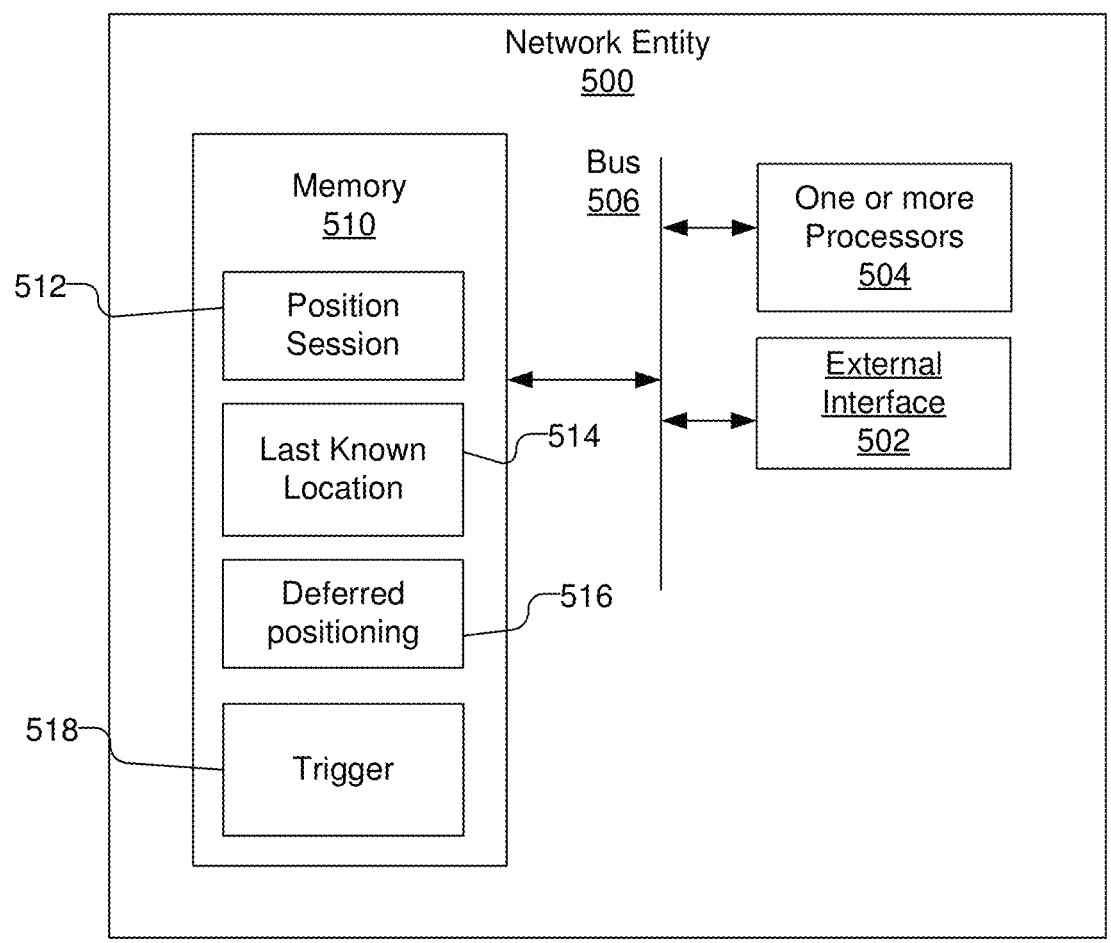
FIG. 5 is a block diagram of an embodiment of a network entity such as an MME, E-SMLC, SLP, GMLC or eNodeB.

FIG. 5 is a diagram illustrating an example of a hardware implementation of a network entity 500, such as the MME 108, E-SMLC 110, GMLC 116, H-SLP 118, H-GMLC 148 or eNB 104. The network entity 500 includes, e.g., hardware components such as an external interface 502, which may be a wired or wireless interface capable of connecting to UE 102 directly or through one or more intermediary networks (e.g. HPLMN 140 and/or VPLMN EPC 130 and E-UTRAN 120) and/or one or more network entities (e.g. eNB 104 and/or MME 108). The network entity 500 includes one or more processors 504 and memory 510, which may be coupled together with bus 506. The memory 510 may contain executable code or software instructions that when executed by the one or more processors 504 cause the one or more processors to operate as a special purpose computer programmed to perform the techniques disclosed herein. As illustrated in FIG. 5, the memory 510 may include one or more components or modules that may be implanted by the one or more processors 504 to perform the methodologies as described herein. While the components or modules are illustrated as software in memory 510 that is executable by the one or more processors 504, it should be understood that the components or modules may be dedicated hardware either in the one or more processors 504 or off the processors. It should be understood that, since the network entity 500 can correspond to a number of different network entities, not all the functions and components for the network entity 500 described herein may be present for any particular example of the network entity 500.

For example, the memory 510 may include a position session unit 512 that when implemented by the one or more processors 504 configures the one or more processors 504 to enable communication, e.g., via the external interface 502, with a user equipment (e.g. UE 102) to request a location session, or receive a request for a location session. When implemented by the one or more processors 504, the position session unit 512 may configure the one or more processors 504 to receive an indication that the user equipment supports NB-IoT radio access and/or CIoT features, e.g., from the user equipment in a location request message or acknowledgement of a location request message, or in a location request from another entity, such as the external client 150 or MME 108. The received indication may further define aspects of NB-IoT radio access and/or CIoT features that are supported by the UE 102. The network entity 500 may also or instead be configured with base station configuration data (e.g. BSA data) and/or cell configuration data such as an identification of base stations (e.g. eNB 104 and/or eNB 106) and/or cells that support NB-IoT access, stored in memory. When implemented by the one or more processors 504, the position session unit 512 may configure the one or more processors 504 to infer that a user equipment (e.g. UE 102) supports Narrowband Internet of Things (NB-IoT) radio access or Cellular Internet of Things (CIoT) features based on a received identification of the base station or cell serving the user equipment and the base station or cell configuration data with the identification of base stations or cells that support NB-IoT access. In response to determining that a user equipment (e.g. UE 102) supports Narrowband Internet of Things (NB-IoT) radio access or Cellular Internet of Things (CIoT) features, the one or more processors 504 implementing the position session unit 512 may limit the positioning interaction with the user equipment. The network entity 500 may be configured with configuration parameters, e.g., stored in memory 510, such as a maximum message size, a maximum positioning message size or a maximum expected message transfer delay for a user equipment that is using NB-IOT radio access or CIoT features, or a combination thereof. The one or more processors 504 implementing the position session unit 512 may limit the positioning interaction with the user equipment by using a reduced maximum positioning message size, longer retransmission and response timers, a restricted size of assistance data, and/or by requesting a reduced number of location measurements from the user equipment relative to positioning interaction for another UE with a non-NB-IoT radio access and non-CIoT features.

The memory 510 may include a last known location unit 514 that when implemented by the one or more processors 504 configures the one or more processors 504 to receive location measurements for a UE 102 (e.g. from the UE 102 or from eNB 104) and cause the location measurements to be stored, e.g., in memory 510 or other memory. The location measurements, for example, may be a cell ID (e.g. a last serving cell ID), a base station ID (e.g. a last serving eNB ID such as for eNB 104), and at least one of a received signal strength indicator (RSSI), RSRP, RSRQ, RSTD and round trip time (RTT). The location measurements, by way of example, may be obtained by the UE 102 before the UE 102 is wirelessly connected to a network or after the UE 102 is wirelessly connected to the network, and may be received by the one or more processors 504 while the UE 102 is wirelessly connected to the network. The location measurements may also or alternatively be obtained from measurement performed by an access point, such as eNB 104 (shown in FIG. 1) when the UE 102 is wirelessly connected to the network. The last known location unit 514 configures the one or more processors 504 to use the location measurements for a determination of a last known location of the UE 102 when the UE 102 is not wirelessly connected to a network. For example, if the network entity 500 is, e.g., the MME 108 or eNB 104, but not the location server, e.g., the E-SMLC 110, then upon receiving a positioning request for the UE 102 (e.g. from GMLC 116) when the UE 102 is not wirelessly connected to the network (e.g. and not reachable for positioning), the one or more processors 504 configured by the last known location unit 514 may cause the external interface 502 to transmit the stored location measurements for the UE 102 to a location server (e.g. E-SMLC 110) with an indication that the UE 102 is not wirelessly connected to the network. Alternatively, the last known location unit 514 may configure the one or more processors 504 to cause the position session unit 512 to use the stored location measurements to determine the last known location of the UE 102. The external interface 502 may further transmit the last known location of the UE 102 (e.g. when obtained by the network entity 500) to an external client 150 or a requesting entity such as GMLC 116 or H-GMLC 148.

The memory 510 may include a deferred positioning unit 516 that when implemented by the one or more processors 504 configures the one or more processors 504 to cause the position session unit 512 to engage in a positioning session with a UE 102, and to permit the UE 102 to defer obtaining location measurements until the UE 102 is no longer connected to the network. The deferred positioning unit 516 configures the one or more processors 504 to permit the UE 102 to reengage the positioning session and provide the location measurements for a positioning session implemented by the position session unit 512 after the UE 102 has re-entered a connected state.

The memory 510 may include a trigger unit 518 that when implemented by the one or more processors 504 configures the one or more processors 504 to define trigger parameters comprising a trigger evaluation interval, a periodic maximum reporting interval trigger, and/or one or more location triggers and cause the external interface 502 to provide the trigger parameters to the UE 102 in a mobile terminated location request. For example, the location triggers may comprise at least one of: (i) a fixed periodic reporting interval; (ii) a change of cell; (iii) a change of TA; (iv) an entry into, an exit from or a remaining within a geographic area defined according to a group of cells and/or TAs; or (v) a movement by more than a threshold linear distance from a previous location.

The methodologies described herein may be implemented by various means depending upon the application. For example, these methodologies may be implemented in network entity 500 using hardware, firmware, software, or any combination thereof. For a hardware implementation, the one or more processors 504 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network entity 500 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the techniques disclosed herein. Memory may be implemented within the one or more processors 504 or external to the one or more processors 504 (e.g. as memory 510). As used herein the term "memory" refers to any type of long term, short term, volatile, nonvolatile, or other memory and is not to be limited to any particular type of memory or number of memories, or type of media upon which memory is stored.

If implemented in firmware and/or software in network entity 500, the functions described herein may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for network entity 500 may be provided as signals on transmission media included in a communication apparatus that may comprise part or all of network entity 500. For example, a communication apparatus may include a transceiver having signals indicative of instructions and data. The instructions and data are stored on non-transitory computer readable media, e.g., memory 510, and are configured to cause the one or more processors 504 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a network entity 500 may include a means for receiving an indication that a user equipment (e.g. UE 102) is using Narrowband Internet of Things (NB-IoT) radio access or Cellular Internet of Things (CIoT) features, which may be, e.g., the external interface 502 and the one or more processors 504 with dedicated hardware or implementing executable code or software instructions in memory 510 such as the position session unit 512. A means for limiting positioning interaction with the UE in response to the indication that the UE is using NB-IOT radio access or CIoT features, wherein limiting the positioning interaction comprises at least one of using a reduced maximum positioning message size, using longer retransmission and response timers, using a restricted size of assistance data, or requesting a reduced number of location measurements from the UE, each relative to positioning interaction for another UE with a non-NB-IoT radio access and non-CIoT features, may be, e.g., the one or more processors 504 with dedicated hardware or implementing executable code or software instructions in memory 510 such as the position session unit 512.

An apparatus, such as the network entity 500, may include a means for receiving location measurements for a user equipment (e.g. UE 102) that is using Narrowband Internet of Things (NB-IoT) radio access or Cellular Internet of Things (CIoT) features, which may be, e.g., the external interface 502 and the one or more processors 504 with dedicated hardware or implementing executable code or software instructions in memory 510 such as the last known location unit 514. A means for storing the location measurements and a timestamp may be, e.g., memory 510 and the one or more processors 504 with dedicated hardware or implementing executable code or software instructions in memory 510 such as the last known location unit 514. Means for receiving a location request for the user equipment when the user equipment is not connected to the wireless network may include, e.g., the external interface 502 and the one or more processors 504 with dedicated hardware or implementing executable code or software instructions in memory 510 such as the position session unit 512. A means for transmitting the location measurements to a location server (e.g. E-SMLC 110) with an indication that the user equipment is not connected to the wireless network may be, e.g., the external interface 502 and the one or more processors 504 with dedicated hardware or implementing executable code or software instructions in memory 510 such as the last known location unit 514. A means for receiving a response from the location server comprising a last known location for the user equipment may include, e.g., the external interface 502 and the one or more processors 504 with dedicated hardware or implementing executable code or software instructions in memory 510 such as the last known location unit 514.

An apparatus, such as the network entity 500, may include a means for receiving a location request for a user equipment (e.g. UE 102) that is using Narrowband Internet of Things (NB-IoT) radio access or Cellular Internet of Things (CIoT) features, wherein the location request comprises location measurements for the UE and an indication that the UE is not connected to a wireless network; which may be, e.g., the external interface 502 and the one or more processors 504 with dedicated hardware or implementing executable code or software instructions in memory 510 such as the position session unit 512. A means for determining a last known location for the UE based on the location measurements may be, e.g., the one or more processors 504 with dedicated hardware or implementing executable code or software instructions in memory 510 such as the last known location unit 514. A means for returning a location response comprising the last known location for the UE may be, e.g., the external interface 502.

An apparatus, such as the network entity 500, may include a means for engaging in a positioning session with a user equipment (e.g. UE 102) that is using Narrowband Internet of Things (NB-IoT) radio access or Cellular Internet of Things (CIoT) features to access a wireless network, which may be, e.g., the external interface 502 and the one or more processors 504 with dedicated hardware or implementing executable code or software instructions in memory 510 such as the position session unit 512. Means for receiving an indication that the UE will defer performing location measurements for the positioning session until the UE is not in a connected state with the wireless network may be, e.g., the external interface 502 and the one or more processors 504 with dedicated hardware or implementing executable code or software instructions in memory 510 such as the deferred positioning unit 516. A means for sending a request for location measurements to the UE, wherein the request for location measurements comprises an increased maximum response time that is higher than a maximum response time for another UE for which the indication was not received may be, e.g., the external interface 502 and the one or more processors 504 with dedicated hardware or implementing executable code or software instructions in memory 510 such as the deferred positioning unit 516 and the position session unit 512. A means for receiving the requested location measurements from the UE prior to expiration of the increased maximum response time may be, e.g., the external interface 502 and the one or more processors 504 with dedicated hardware or implementing executable code or software instructions in memory 510 such as the position session unit 512. A means for determining a location for the UE based on the received location measurements may be, e.g., the one or more processors 504 with dedicated hardware or implementing executable code or software instructions in memory 510 such as the position session unit 512.

In one implementation, a non-transitory computer readable medium may have stored therein computer executable instructions executable by one or more processors to: receive a location request for a user equipment (UE) that is using Narrowband Internet of Things (NB-IoT) radio access or Cellular Internet of Things (CIoT) features, wherein the location request comprises location measurements for the UE and an indication that the UE is not connected to a wireless network; determine a last known location for the UE based on the location measurements; and return a location response comprising the last known location for the UE.

Figure 6:
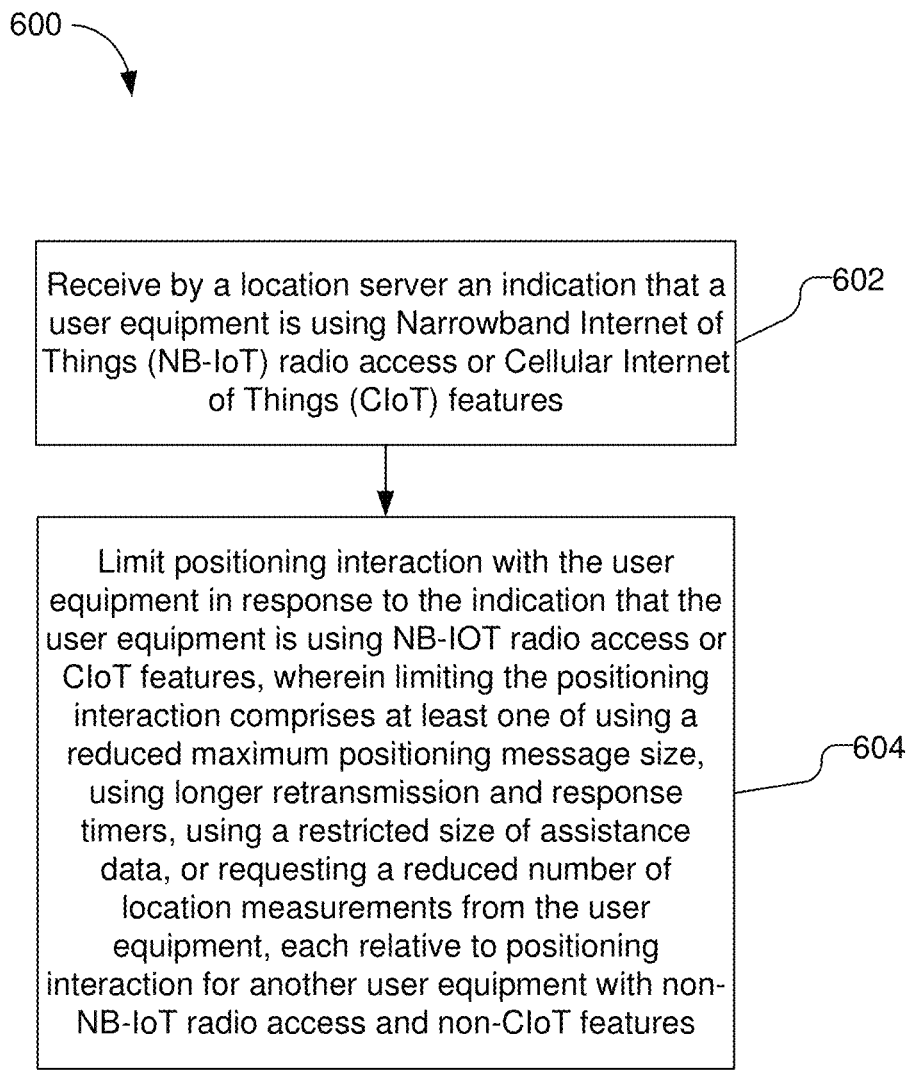
FIGS. 6, 7, 8, 9, 10 and 11 are flow charts exemplifying techniques for supporting location for an NB-IoT or CIoT device.

FIG. 6 shows a process flow 600 illustrating a method of limiting positioning interaction with a UE (e.g. UE 102) when the UE is using NB-IOT radio access or CIoT features to access a wireless network (e.g. VPLMN EPC 130 and E-UTRAN 120). The process flow 600 may be performed by a location server such as the E-SMLC 110 or the H-SLP 118 in network architecture 100. The process flow 600 may start at block 602 where the location server receives an indication that the UE is using Narrowband Internet of Things (NB-IoT) radio access and/or Cellular Internet of Things (CIoT) features to access the wireless network. When the location server is an E-SMLC (e.g. E-SMLC 110), the indication may be received in a location request message (e.g. an LCS-AP Location Request) sent by an MME (e.g. MME 108). When the location server is an SLP (e.g. H-SLP 118), the indication may be received in a location request message (e.g. a location request message defined for the OMA Mobile Location Protocol (MLP)) sent by an external client (e.g. external client 150). In other cases, the indication may be received from the UE (e.g. in an LPP or LPP/LPPe positioning protocol message) or from a serving eNodeB for the UE (e.g. eNB 104) (e.g. in an LPPa message). In another embodiment, the location server may be configured with base station configuration data (e.g. BSA data) or cell configuration data which may include an indication of base stations or cells, respectively, that support NB-IoT radio access. The indication may then be received (e.g. from the UE, an MME or an eNB) as an identification of a base station or cell that is currently serving the UE: the location server may then infer that the UE is using NB-IoT radio access or CIoT features based on an indication in the base station or cell configuration data, respectively, that the identified base station or cell currently serving the UE supports NB-IoT radio access.

At block 604, the location server limits positioning interaction with the UE in response to the indication that the UE is using NB-IOT radio access or CIoT features. Limiting positioning interaction with the UE may include at least one of using a reduced maximum positioning message size (e.g. for LPP or LPP/LPPe), using longer retransmission and response timers, using a restricted size of assistance data, or requesting a reduced number of location measurements from the UE, where each type of limitation is relative to positioning interaction for another UE that uses a non-NB-IoT radio access and non-CIoT features (e.g. such as another UE that uses normal LTE radio access).

To support the limited positioning interaction with the UE in block 604, the location server may be configured with one or more configuration parameters for NB-IoT radio access and/or CIoT features. The configuration parameter(s) may comprise a maximum positioning message size (e.g. for LPP and/or LPP/LPPe), a maximum message volume, and/or a maximum expected message transfer delay for a UE that is using NB-IOT radio access or CIoT features.

In some embodiments, to support the limited positioning interaction with the UE in block 604, the indication received at block 602 may comprise aspects of NB-IoT radio access and CIoT features that are supported (e.g. by the wireless network) for the UE. The aspects of NB-IoT radio access and CIoT features supported for the UE may comprise at least one of a maximum positioning message size (e.g. for LPP or LPP/LPPe), a maximum message volume, a maximum expected message transfer delay, or some combination of these.

Figure 7:
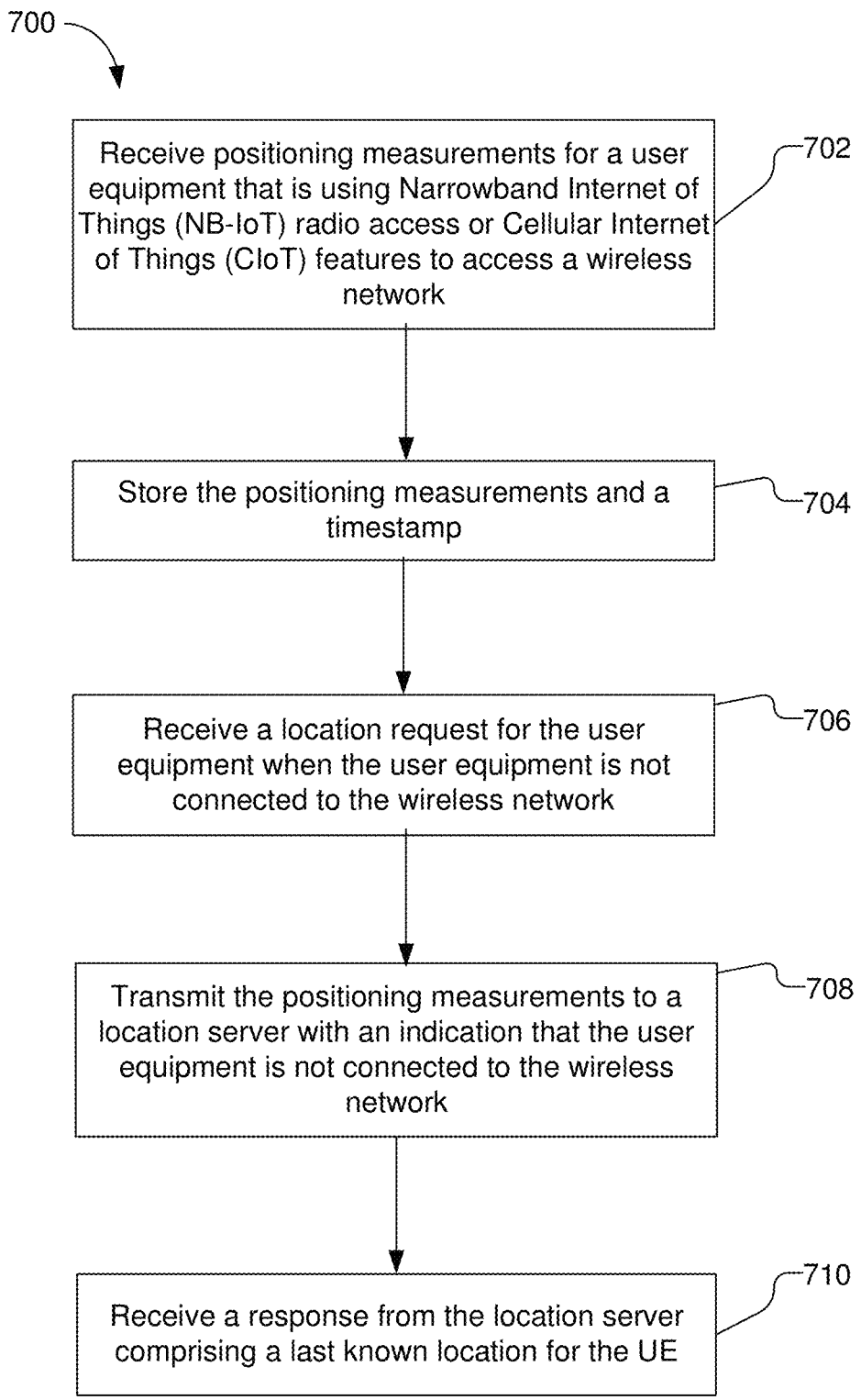

FIG. 7 shows a process flow 700 illustrating a method of determining a last known location for a UE (e.g. UE 102) that is using NB-IoT radio access and/or CIoT features to access a wireless network (e.g. VPLMN EPC 130 and E-UTRAN 120). The process flow 700 may be performed by a serving MME for the UE (e.g. MME 108). The process flow 700 may start at block 702 where location measurements are received by the MME for the UE. The location measurements may have been obtained by the UE immediately prior to connecting to the wireless network or while connected to the wireless network, and may be received from the UE (e.g. in a NAS message as defined in 3GPP TS 24.301) while the UE is connected to the wireless network. Alternatively or in addition, the location measurements may have been obtained by the UE and transferred to an access point such as a serving base station for the UE (e.g. the eNB 104) and/or may have been obtained by the access point (e.g. eNB 104), and may then be received by the MME from the access point (e.g. using LPPa) while the UE is connected to the wireless network or immediately after the UE is no longer connected to the wireless network. The location measurements may include a last known serving cell identity (ID) or last known serving eNodeB ID for the UE while the UE was connected to the wireless network. The location measurements may further include a received signal strength indication (RSSI), a reference signal received power (RSRP), a reference signal received quality (RSRQ), a signal to noise ratio (S/N), a round trip signal propagation time (RTT), a reference signal time difference (RSTD), or some combination of these. Block 702 may correspond to stages 201 and 202 and/or stage 205 in signaling flow 200 in some embodiments.

At block 704 in process flow 700, the MME may store the location measurements received at block 702 and a timestamp. The timestamp may correspond to the time (and date) at which the location measurements were received by the MME, the time (and date) at which the location measurements were obtained by the UE or by an access point if this was earlier, or the time (and date) at which the UE enters an idle state (e.g. if the location measurements comprise a last known cell ID or last known eNB ID). Block 704 may correspond to stage 203 and/or stage 205 in signaling flow 200 in some embodiments.

At block 706, the MME receives a location request for the UE when the UE is not connected to the wireless network (as a consequence of a signaling connection release for the UE as at stage 205 in signaling flow 200). The location request may be received from a GMLC (e.g. GMLC 116) which may in turn have received the location request from an external client (e.g. external client 150) or from another GMLC (e.g. H-GMLC 148). The location request may include a request for a current or last known location for the UE. Block 706 may correspond to stage 207 in signaling flow 200 in some embodiments.

At block 708, the MME transmits the location measurements to a location server with an indication that the UE is not connected to the wireless network. In some embodiments, the location server may be an E-SMLC (e.g. E-SMLC 110) and the location measurements may be transmitted to the E-SMLC as part of an LCS-AP Location Request. The MME may include the indication that the UE is not connected to the wireless network if the UE is not reachable from the MME for positioning (e.g. if the UE is using eDRX or PSM). The indication that the UE is not connected to the wireless network may in some embodiments be an indication that a last known location for the UE is requested by the MME or an indication that the UE is not currently reachable from the wireless network. Block 708 may be triggered in some embodiments by the UE not being connected to and not reachable from the wireless network combined with the location request received at block 706 including a request for a last known location for the UE (or a request for current or last known location for the UE). Block 708 may correspond to stage 208 in signaling flow 200 in some embodiments.

At block 710, the MME receives a response from the location server comprising a last known location for the UE. For example, the location server may have determined (e.g. calculated) the last known location using the location measurements transmitted at block 708 and based on the indication transmitted at block 708 that the UE is not connected to the wireless network. Block 710 may correspond to stage 210 in signaling flow 200 in some embodiments.

Following block 710 (and not shown in FIG. 7), the MME may return a location response to the source of the location request received at block 706 and may include in the location response the last known location for the UE received at block 710 and the timestamp stored at block 704.

Figure 8:
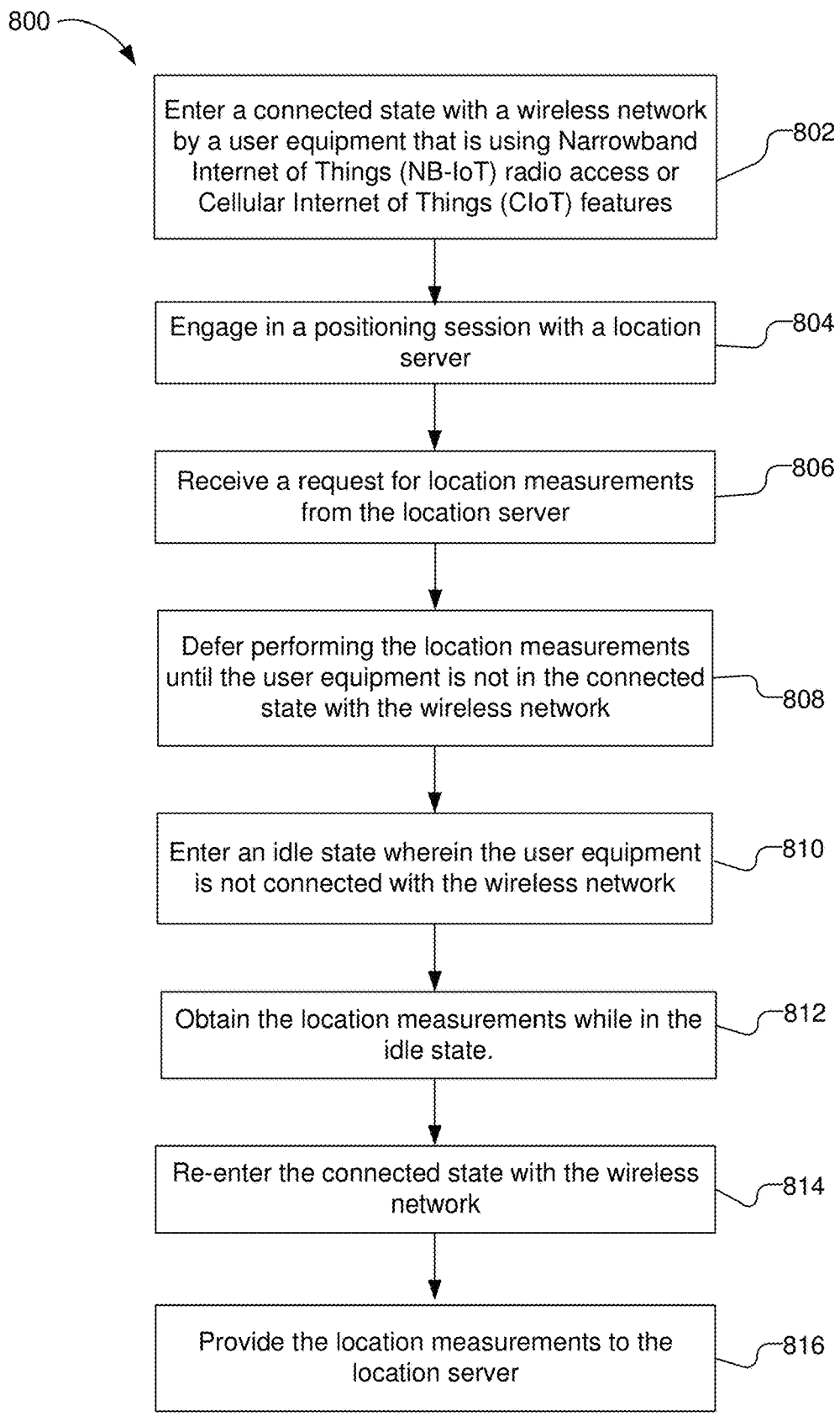

FIG. 8 shows a process flow 800 illustrating a method of deferring performing location measurements by a UE (e.g. UE 102) until the UE is in an idle state. The process flow 800 may be performed by a UE (e.g. UE 102) that is using Narrowband Internet of Things (NB-IoT) radio access or Cellular Internet of Things (CIoT) features to access a wireless network (e.g. VPLMN EPC 130 and E-UTRAN 120). In some embodiments, the process flow 800 may be performed by other UEs using other types of radio access (e.g. LTE wideband access or eMTC access)—e.g. if a UE 102 has limited resources (e.g. limited processing, memory and/or RF transceivers).

Process flow 800 may start at block 802 where the UE enters a connected state with a wireless network—e.g. as a consequence of obtaining a signaling connection to a serving eNB (e.g. eNB 104) and serving MME (e.g. MME 108). Block 802 may correspond to stage 307 in signaling flow 300 in some embodiments.

At block 804, the UE engages in a positioning session with a location server. In some embodiments, the positioning session may be a positioning session for the 3GPP CP location solution for LTE, eMTC or NB-IoT access as defined in 3GPP TS 36.305; in this case, the location server may be an E-SMLC (e.g. E-SMLC 110). In other embodiments, the positioning session may be a positioning session for the OMA SUPL UP location solution (e.g. as defined in OMA TS OMA-TS-ULP-V2_0_3); in this case, the location server may be an SLP (e.g. H-SLP 118). In some embodiments (e.g. for a positioning session for an MT-LR), engaging in the positioning session with the location server by the UE may comprise receiving a message from the location server (e.g. a SUPL, LPP or LPP/LPPe message) to initiate or start the positioning session. In some other embodiments (e.g. for a positioning session for an MO-LR), engaging in the positioning session with the location server by the UE may comprise transmitting a message to the wireless network or to the location server (e.g. a SUPL, NAS MO-LR, LPP or LPP/LPPe message) to initiate or start the positioning session. In some embodiments, engaging in the positioning session with the location server may include transmitting an indication to the location server or to the wireless network (e.g. to a serving MME for the UE in the wireless network such as MME 108) that the UE will defer performing location measurements for the positioning session until the UE is not in the connected state. In some embodiments, the indication may comprise an indication for one or more position methods that the UE performs location measurements for the one or more position methods while in an idle state. In some embodiments, the indication is an indication for the LPP or LPPe positioning protocol. For example, the indication may be a parameter or a flag for positioning capabilities of the UE associated with a particular position method or with all position methods supported by the UE and may be sent by the UE to the location server using an LPP or LPP/LPPe Provide Capabilities message.

At block 806, the UE receives a request for location measurements from the location server. For example, the request may be received in an LPP or LPP/LPPe Request Location Information message. The location measurements requested may include measurements for one or more position methods such as ECID, OTDOA, A-GNSS, WiFi, sensors etc. and/or may include a request for a location estimate for the UE. Block 806 may correspond to stage 310 in signaling flow 300 in some embodiments.

At block 808, the UE may defer performing the location measurements requested at block 806 until the UE is not in the connected state with the wireless network. For example, block 808 may be performed when the UE does not have enough resources (e.g. processing, memory, RF receiver chains) to obtain the requested location measurements while connected to the wireless network.

At block 810, the UE enters an idle state wherein the UE is not connected with the wireless network. For example, the UE may: (i) wait until a signaling connection to the wireless network is released or suspended by the wireless network such as by a serving eNB (e.g. eNB 104) or serving MME (e.g. MME 108) for the UE; (ii) release or suspend a signaling connection to the wireless network itself (e.g. after some timeout period during which the UE detects no activity such as for data or SMS with the wireless network); or (iii) request release or suspension of a signaling connection to the wireless network from a serving eNB (e.g. eNB 104), a serving MME (e.g. MME 108) or the location server. Block 810 may correspond to stage 311 in signaling flow 300 in some embodiments.

At block 812, the UE obtains the location measurements requested at block 806 while in the idle state. Obtaining the location measurements while in the idle state may enable the UE to allocate more resources (e.g. processing, memory, RF receiver chains) to obtaining the location measurements than when the UE is in a connected state which may improve measurement accuracy, reduce response time and/or enable use of certain position methods. Block 812 may correspond to stage 312 in signaling flow 300 in some embodiments.

At block 814, the UE re-enters the connected state with the wireless network. For example, the UE may send a NAS Service Request, NAS Control Plane Service Request or RRC Connection Resume to the wireless network such as to an eNB (e.g. eNB 104) or serving MME (e.g. MME 108) in order to initiate the reentry to connected state. Block 814 may correspond to stage 313 in signaling flow 300 in some embodiments.

At block 816, the UE provides the location measurements obtained at block 812 to the location server. For example, the UE may send the location measurements to the location server in an LPP or LPP/LPPe Provide Location Information message. Block 816 may correspond to stage 314 in signaling flow 300 in some embodiments. The location server may then use the location measurements to determine a location for the UE (e.g. as at stage 315 in signaling flow 300).

Figure 9:
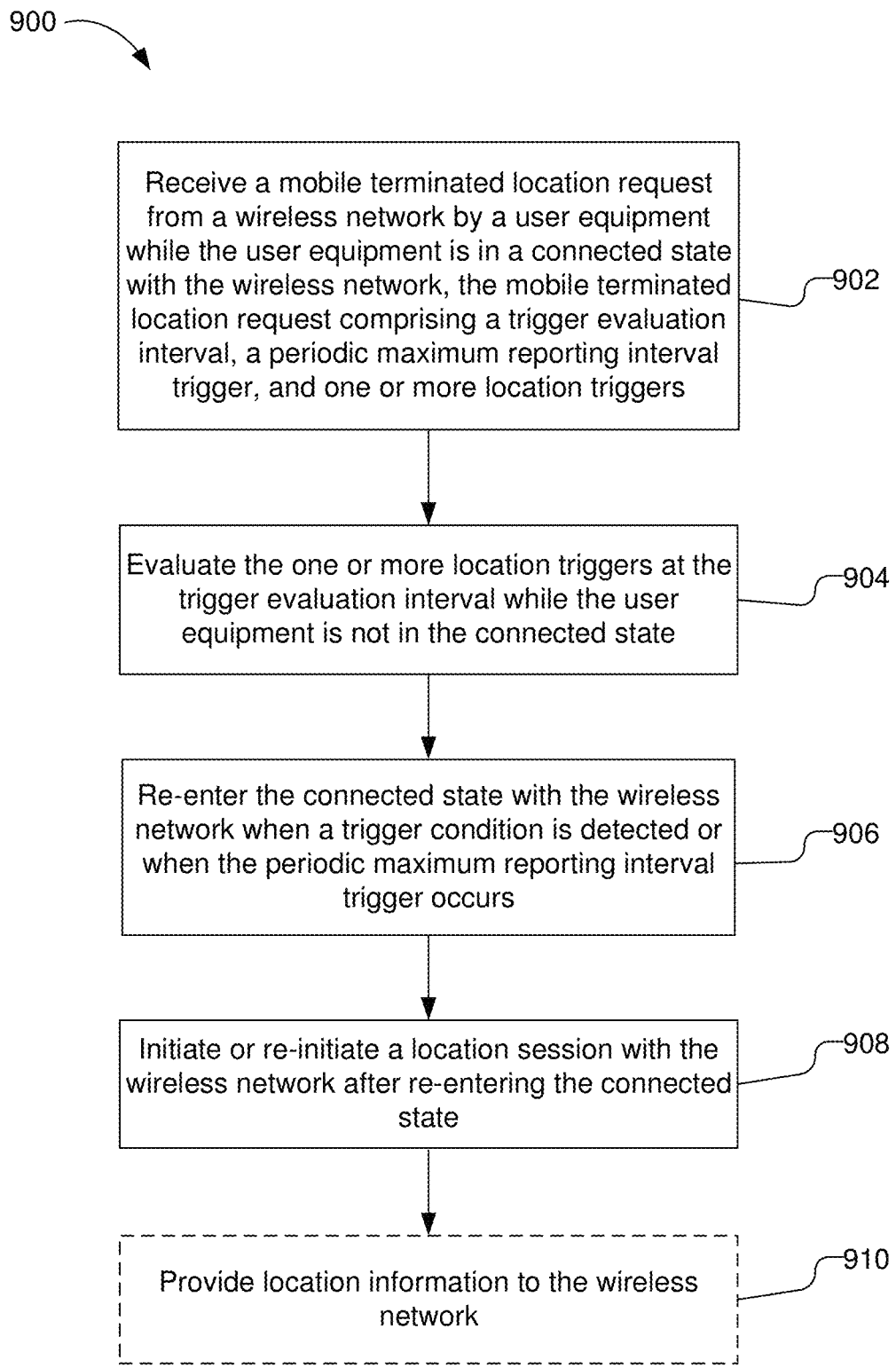

FIG. 9 shows a process flow 900 illustrating a method of supporting a location session for periodic and triggered location at a user equipment. The process flow 900 may be performed by a UE such as UE 102. In some embodiments, a UE that performs the process flow 900 may use Narrowband Internet of Things (NB-IoT) radio access or Cellular Internet of Things (CIoT) features to access a wireless network (e.g. VPLMN EPC 130 and E-UTRAN 120) but other UEs (e.g. a UE with normal wideband LTE access) may also perform process flow 900.

Process flow 900 may start at Block 902 where a UE receives a mobile terminated location request (MT-LR) from a wireless network while the UE is in a connected state with the wireless network. The mobile terminated location request may comprise a trigger evaluation interval (e.g. a minimum or a maximum trigger evaluation interval), a periodic maximum reporting interval trigger, and one or more location triggers. The mobile terminated location request may be received from a serving MME (e.g. MME 108) or from a location server (e.g. E-SMLC 110 or H-SLP 118). The one or more location triggers may comprise at least one of i) a fixed periodic location reporting interval; (ii) a change of cell; (iii) a change of Tracking Area; (iv) an entry into, an exit from or a remaining within a geographic area defined according to a group of cells and Tracking Areas; or (v) a movement of the UE by more than a threshold linear distance from a previous location for the UE.

At block 904, the UE evaluates the one or more location triggers at the trigger evaluation interval while the UE is not in the connected state with the wireless network. The UE may also evaluate the one or more location triggers while the UE is in a connected state with the wireless network in some embodiments.

At block 906, the UE re-enters the connected state with the wireless network when a trigger condition is detected by the UE or when the periodic maximum reporting interval trigger occurs.

At block 908, the UE initiates or re-initiates a location session with the wireless network after re-entering the connected state. For example, the UE may initiate a new location session, or may resume a previous location session, with one or more entities in the wireless network (e.g. the MME 108, E-SMLC 110 and/or H-SLP 118).

At block 910, which is an optional block and shown using dashed lines, the UE may provide location information to the wireless network. The location information may comprise location measurements, a location estimate, an indication of the trigger condition detected at block 906, or some combination of these. The location information may be provided to an entity in the wireless network such as an E-SMLC (e.g. E-SMLC 110) or SLP (e.g. H-SLP 118).

Figure 10:
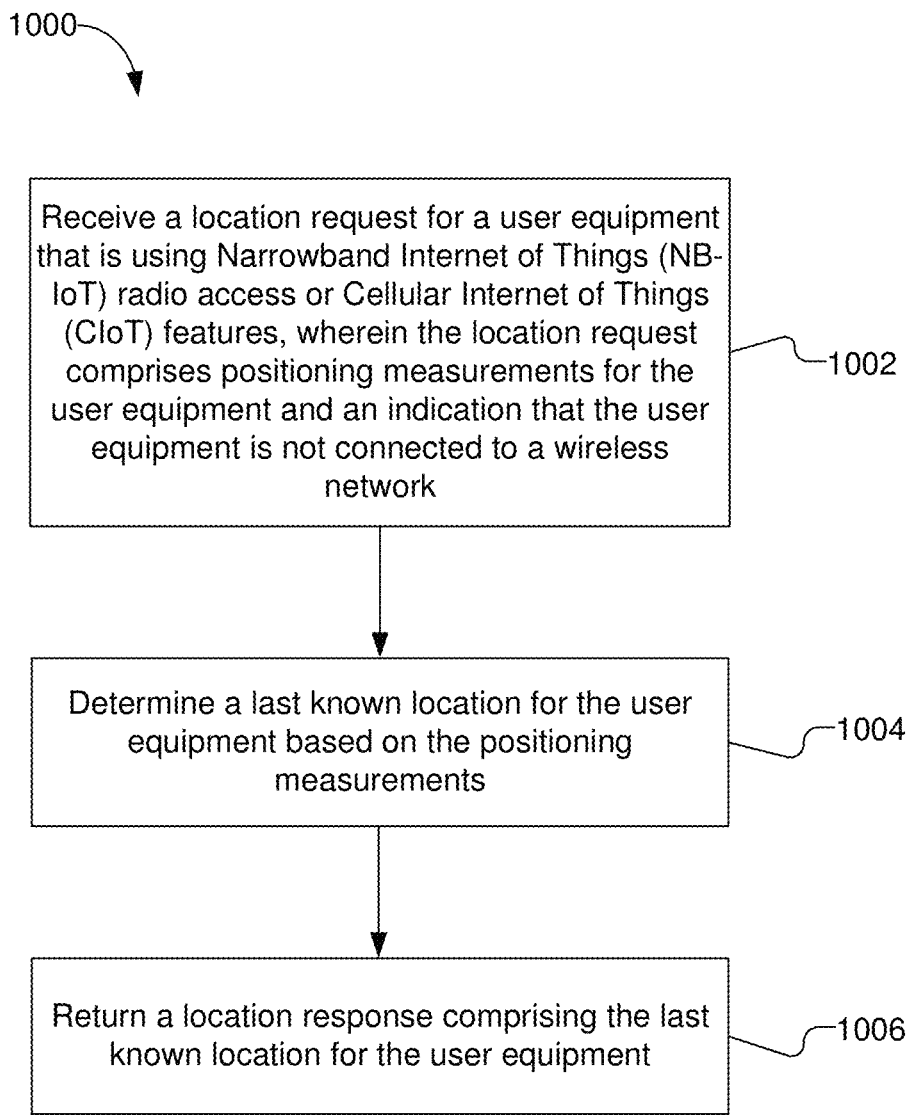

FIG. 10 shows a process flow 1000 illustrating a method of supporting a last known location for a UE that is using NB-IoT radio access and/or CIoT features to access a wireless network. The process flow 1000 may be performed by a location server such as E-SMLC 110.

Process flow 1000 may start at Block 1002 where the location server receives a location request for a UE that is using Narrowband Internet of Things (NB-IoT) radio access and/or Cellular Internet of Things (CIoT). The location request may comprise location measurements for the UE and an indication that the UE is not connected to a wireless network. In some embodiments, the location request may comprise an LCS-AP Location Request and may be sent to the location server by a serving MME for the UE (e.g. MME 108). In some embodiments, the indication that the UE is not wirelessly connected to the network may comprise an indication that: (i) the UE is not reachable for positioning from the wireless network; (ii) a last known location is requested for the UE; and/or (iii) a location is requested for the UE based only on information included in the location request. In some embodiments, the location measurements for the UE may have been obtained by the UE prior to connecting to the wireless network or prior to disconnecting from the wireless network. In some embodiments, the location measurements for the UE may have been obtained by an access point, such as a serving eNB (e.g. eNB 104), after the UE was connected to the wireless network and prior to the UE disconnecting from the wireless network. In some embodiments, the location measurements comprise a last known serving cell ID or a last known serving eNodeB ID for the UE before the UE was no longer connected to the wireless network. In some embodiments, the location measurements may further comprise a received signal strength indication (RSSI), a reference signal received power (RSRP), a reference signal received quality (RSRQ), a round trip time (RTT), a reference signal time difference (RSTD), or some combination of these. In some embodiments, block 1002 may correspond to stage 208 in signaling flow 200.

At block 1004 of process flow 1000, the location server determines a last known location for the user equipment based on the location measurements received at block 1002. For example, when the location measurements include a last known serving cell ID or last known eNodeB ID, the location server may determine the last known location based on the cell ID position method. Alternatively, when the location measurements include one or more of an RSSI, RSRP, RSRQ or RTT measurement, the location server may determine the last known location based on the ECID position method. Alternatively, when the location measurements include one or more RSTD measurements, the location server may determine the last known location based on the OTDOA position method. In some embodiments, block 1004 may correspond to stage 209 in signaling flow 200.

At block 1006, the location server returns a location response comprising the last known location for the user equipment determined at block 1004. In some embodiments, block 1006 may correspond to stage 210 in signaling flow 200.

Figure 11:
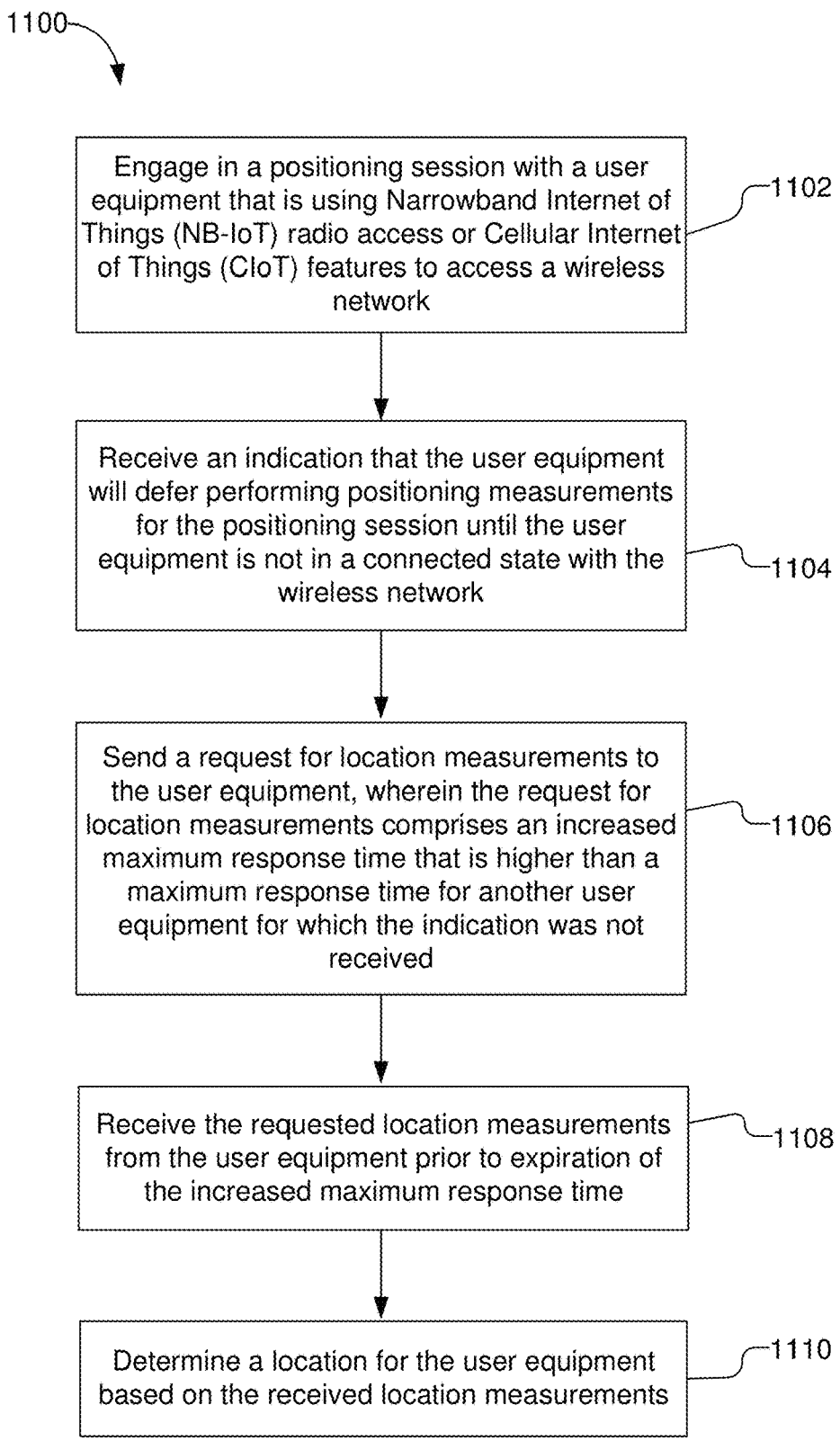

FIG. 11 shows a process flow 1100 illustrating a method of enabling a UE (e.g. UE 102) to defer location measurements until the UE is in an idle state. The process flow 1100 may be performed by a location server (e.g. E-SMLC 110 or H-SLP 118) that needs to obtain a location for a UE (e.g. UE 102) that is using Narrowband Internet of Things (NB-IoT) radio access or Cellular Internet of Things (CIoT) features to access a wireless network (e.g. VPLMN EPC 130 and E-UTRAN 120).

Process flow 1100 may start at block 1102 where the location server engages in a positioning session with a UE (e.g. UE 102) that is using Narrowband Internet of Things (NB-IoT) radio access or Cellular Internet of Things (CIoT) features to access a wireless network. In some embodiments, the positioning session may be a positioning session for the 3GPP CP location solution for LTE, eMTC or NB-IoT access as defined in 3GPP TS 36.305; in this case, the location server may be an E-SMLC (e.g. E-SMLC 110). In other embodiments, the positioning session may be a positioning session for the OMA SUPL UP location solution (e.g. as defined in OMA TS OMA-TS-ULP-V2_0_3); in this case, the location server may be an SLP (e.g. H-SLP 118). In some embodiments (e.g. for a positioning session for an MT-LR), engaging in the positioning session with the UE may comprise sending a message to the UE (e.g. a SUPL, LPP or LPP/LPPe message) to initiate or start the positioning session. In some embodiments (e.g. for a positioning session for an MO-LR), engaging in the positioning session with the UE may comprise receiving a message sent by the UE or sent by an entity in the wireless network (e.g. an MME) to initiate the positioning session. For example, the location server may receive a SUPL, LPP or LPP/LPPe message sent by the UE to initiate the positioning session or may receive an LCS-AP Location Request sent by a serving MME for the UE (e.g. MME 108) to initiate the positioning session.

At block 1104 in process flow 1100, the location server receives an indication that the UE will defer performing location measurements for the positioning session until the UE is not in a connected state with the wireless network. In some embodiments, the indication may comprise an indication for one or more position methods that the UE performs location measurements for the one or more position methods while in an idle state. In some embodiments, the indication is an indication for the LPP or LPPe positioning protocol. For example, the indication may be a parameter or a flag for positioning capabilities of the UE associated with a particular position method or associated with all position methods supported by the UE and may be sent by the UE to the location server using an LPP or LPP/LPPe Provide Capabilities message.

At block 1106, the location server sends a request for location measurements to the UE, where the request for location measurements comprises an increased maximum response time that is higher than a maximum response time for another UE for which the indication was not received. For example, the location server may send an LPP or LPP/LPPe Request Location Information message to the UE containing the increased maximum response time as part of a Quality of Service (QoS) parameter in the message. In some embodiments, the location server may be configured with one or more maximum response times for UEs that are able to obtain location measurements while connected to a wireless network. The maximum response times for these UEs may be related to particular position methods, to a location accuracy, to a location response time requested by an external client (e.g. external client 150), and/or to a location service or application. The maximum response times may be higher for position methods for which location measurements typically take more time, where higher location accuracy is requested by an external client, where low response time is not requested by an external client, or where a location service or application has high priority. As an example, when high location accuracy (e.g. an error of 50 meters or less) is requested for the A-GNSS position method in association with an emergency call from a UE, a maximum response time of 20 to 30 seconds may be configured. Conversely, when lower location accuracy is requested (e.g. an error of 200 meters or more) for the ECID position method not in association with an emergency call, a maximum response time of 2 to 5 seconds may be configured. In the case of a UE that needs to obtain some or all location measurements when in idle state, these configured maximum response times may be increased. Thus, as an example, in the case of high accuracy location for A-GNSS, a maximum response time of 1 to 5 minutes may be configured and for a lower accuracy location for ECID, a maximum response time of 1 to 2 minutes may be configured. The increased maximum response time sent at block 1106 may enable the UE to wait until the UE is in an idle state before obtaining the location measurements requested by the location server and thereby enable a location to be obtained for the UE. In some embodiments, block 1106 may correspond to stage 310 in signaling flow 300.

At block 1108, the location server receives the requested location measurements from the UE prior to expiration of the increased maximum response time at the location server. For example, the location measurements may be received in an LPP or LPP/LPPe Provide Location Information message sent to the location server by the UE. In order to obtain the location measurements, the UE may first (i) wait until a signaling connection to the wireless network is released or suspended by the wireless network; (ii) release or suspend a signaling connection to the wireless network itself; or (iii) request release or suspension of a signaling connection to the wireless network from a serving eNB (e.g. eNB 104), a serving MME (e.g. MME 108) or the location server, as illustrated for stage 311 of signaling flow 300. Following release of a signaling connection to the wireless network, the UE may obtain the location measurements requested by the location server while in idle state (e.g. as at stage 312 in signaling flow 300) and then re-enter connected state with the wireless network (e.g. as at stage 313 in signaling flow 300) before returning the location measurements to the location server at block 1108. In some embodiments, block 1108 may correspond to stage 314 in signaling flow 300.

At block 1110, the location server determines a location for the UE based on the location measurements received at block 1108. For example, the location server may calculate a location for the UE using BSA data configured in the location server in the case of location measurements for the ECID or OTDOA position methods and/or using GNSS ephemeris and timing data for location measurements for the GNSS or A-GNSS position method. In some embodiments, block 1110 may correspond to stage 315 in signaling flow 300.

Many of the exemplary embodiments of the method described herein assume a UE 102 that is using NB-IOT radio access and/or CIoT features, such as eDRX, PSM and/or CIoT CP optimization, to access a wireless network such as VPLMN EPC 130 and E-UTRAN 120. Some of the embodiments also assume that the 3GPP CP location solution is used to locate the UE 102. However, techniques similar to or the same as those described herein may be used to support or improve support of location for a UE that is associated with or supports other types of IoT features and/or other types of radio access including, for example, radio access according to eMTC, wideband LTE, GSM, WCDMA, cdma2000, WiFi or a future 5G standard. In addition, techniques similar to or the same as those described herein may be used to support or improve support of location for a UE using other location solutions such as the OMA SUPL UP location solution, location solutions defined by IETF and IEEE, and a future CP or UP location solution defined by 3GPP or OMA for 5G radio access. These similar or same solutions may apply whenever a UE makes use of or is otherwise associated with features and limitations applicable to IoT and CIoT, such as power savings features, low resource limitation, limited battery power, limited message size and/or limited message volume.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method, performed by a user equipment (UE), comprising:
  entering, a connected state with a wireless network by the UE;
  transmitting a positioning session message while in the connected state, wherein the positioning session message comprises an indication that the UE will defer performing location measurements for a positioning session until the UE is in an idle state;
  receiving, while in the connected state, a request for the location measurements for the positioning session;
  entering, after reception of the request for the location measurements for the positioning session, the idle state wherein the UE is not connected with the wireless network;
  obtaining the location measurements after entering the idle state;
  entering the connected state with the wireless network after the location measurements are obtained; and
  providing the location measurements to a location server after entering the connected state.

2. The method of claim 1, further comprising receiving a message to initiate the positioning session.

3. The method of claim 1, further comprising transmitting a message to initiate the positioning session.

4. The method of claim 1, wherein the indication comprises one or more position methods for which the UE needs to perform the location measurements while in the idle state.

5. The method of claim 4, wherein the indication is an indication for a Long Term Evolution (LTE) Positioning Protocol (LPP) or a LPP Extensions (LPPe) protocol.

6. The method of claim 1, further comprising waiting for a release or suspension of a signaling connection to the wireless network so that the UE is in the idle state before obtaining the location measurements.

7. The method of claim 1, further comprising releasing a signaling connection to the wireless network so that the UE is in the idle state before obtaining the location measurements.

8. A user equipment (UE), the UE comprising:
one or more wireless transceivers configured to wirelessly communicate with a wireless network; and
one or more processors, either alone or in combination, configured to:
enter a connected state with the wireless network with the one or more wireless transceivers;
transmit, via the one or more wireless transceivers, a positioning session message while in the connected state, wherein the positioning session message comprises an indication that the UE will defer performing location measurements for a positioning session until the UE is in an idle state;
receive, via the one or more wireless transceivers, while in the connected state, with the wireless transceiver a request for the location measurements for the positioning session;
enter, after reception of the request for the location measurements for the positioning session, the idle state wherein the UE is not connected with the wireless network;
obtain the location measurements after entering the idle state;
enter the connected state with the wireless network after the location measurements are obtained; and
provide, via the one or more wireless transceivers, the location measurements to a location server after entering the connected state.

9. The UE of claim 8, wherein the one or more processors, either alone or in combination, are further configured to receive a message to initiate the positioning session.

10. The UE of claim 8, wherein the one or more processors, either alone or in combination, are further configured to cause the wireless transceiver to transmit a message to initiate the positioning session.

11. The UE of claim 8, wherein the indication comprises one or more position methods for which the UE needs to perform the location measurements while in the idle state.

12. The UE of claim 11, wherein the indication is an indication for a Long Term Evolution (LTE) Positioning Protocol (LPP) or a LPP Extensions (LPPe) protocol.

13. The UE of claim 8, wherein the one or more processors, either alone or in combination, are further configured to wait for a release or suspension of a signaling connection to the wireless network so that the UE is in the idle state before obtaining the location measurements.

14. The UE of claim 8, wherein the one or more processors, either alone or in combination, are further configured to release a signaling connection to the wireless network so that the UE is in the idle state before obtaining the location measurements.

* * * * *